US010043149B1

(12) United States Patent
Iacono et al.

(10) Patent No.: US 10,043,149 B1
(45) Date of Patent: Aug. 7, 2018

(54) ADD-ON ORDERS FOR DELIVERY

(71) Applicant: Square, Inc., San Francisco, CA (US)

(72) Inventors: Jeffrey Frank Iacono, San Francisco, CA (US); Benjamin R. Bernstein, San Francisco, CA (US); David S. Howland, Philadelphia, PA (US)

(73) Assignee: SQUARE, INC., San Francisco, CA (US)

( * ) Notice: Subject to any disclaimer, the term of this patent is extended or adjusted under 35 U.S.C. 154(b) by 481 days.

(21) Appl. No.: 14/870,886

(22) Filed: Sep. 30, 2015

(51) Int. Cl.
*G06Q 20/00* (2012.01)
*G06Q 10/08* (2012.01)
*G06Q 50/12* (2012.01)
*G06Q 30/06* (2012.01)
*G06Q 20/20* (2012.01)

(52) U.S. Cl.
CPC ..... *G06Q 10/0835* (2013.01); *G06Q 30/0607* (2013.01); *G06Q 30/0637* (2013.01); *G06Q 50/12* (2013.01); *G06Q 20/202* (2013.01)

(58) Field of Classification Search
CPC .................................................. G06Q 20/202
USPC ........................................................... 705/21
See application file for complete search history.

(56) References Cited

U.S. PATENT DOCUMENTS

| 6,026,375 | A  | 2/2000  | Hall et al.    |
|-----------|----|---------|----------------|
| 6,206,750 | B1 | 3/2001  | Barad et al.   |
| 8,458,044 | B2 | 6/2013  | Blair et al.   |
| 8,504,435 | B2 | 8/2013  | Charles        |
| 9,269,103 | B1 | 2/2016  | Kumar et al.   |
| 9,466,045 | B1 | 10/2016 | Kumar          |
| 9,639,908 | B1 | 5/2017  | Reiss et al.   |
| 9,679,489 | B2 | 6/2017  | Lambert et al. |
| 2002/0077937 | A1 | 6/2002 | Lyons et al. |
| 2002/0138350 | A1 | 9/2002 | Cogen |
| 2002/0143655 | A1 | 10/2002 | Elston et al. |
| 2002/0178074 | A1 | 11/2002 | Bloom |
| 2006/0235754 | A1 | 10/2006 | Walker et al. |
| 2006/0293971 | A1 | 12/2006 | Hunter et al. |
| 2007/0185776 | A1 | 8/2007 | Nguyen et al. |
| 2008/0052163 | A1 | 2/2008 | Koh |
| 2008/0275643 | A1 | 11/2008 | Yaqub et al. |
| 2009/0106124 | A1 | 4/2009 | Yang |
| 2009/0187488 | A1 | 7/2009 | Shamilian |
| 2009/0307096 | A1 | 12/2009 | Antonellis |

(Continued)

OTHER PUBLICATIONS

Non-Final Office Action dated Jan. 11, 2018, for U.S. Appl. No. 14/625,683, of Kumar, A.R., et al., 'filed Feb. 19, 2015.

(Continued)

*Primary Examiner* — A Hunter Wilder
(74) *Attorney, Agent, or Firm* — Mattingly & Malur, PC

(57) ABSTRACT

In some examples, a service provider may receive, from a buyer device, a first order for a first item to be prepared by a first merchant. The service provider may determine a second item offered by the first merchant, or another merchant, that can be added on to the first order by determining a preparation time for the first item, and determining that the second item offered by the first merchant, or the other merchant, has a preparation time less than the preparation time for the first item. The service provider may further determine a threshold time for ordering the second item based on a difference between the preparations time for the first item and the second item. The threshold time may be presented on the buyer device to indicate an amount of time the buyer has to add the second item to the first order.

15 Claims, 11 Drawing Sheets

(56) References Cited

U.S. PATENT DOCUMENTS

| | | |
|---|---|---|
| 2010/0076853 A1 | 3/2010 | Schwarz |
| 2012/0036028 A1 | 2/2012 | Webb |
| 2012/0197722 A1 | 8/2012 | Mesaros |
| 2012/0203619 A1 | 8/2012 | Lutnick et al. |
| 2012/0303425 A1 | 11/2012 | Katzin et al. |
| 2013/0006747 A1 | 1/2013 | Wu |
| 2013/0046605 A1 | 2/2013 | Baron et al. |
| 2013/0054323 A1 | 2/2013 | Charles |
| 2013/0226651 A1 | 8/2013 | Napper |
| 2013/0246207 A1 | 9/2013 | Novak et al. |
| 2013/0290172 A1 | 10/2013 | Mashinsky |
| 2013/0317940 A1 | 11/2013 | Fitz |
| 2014/0011522 A1 | 1/2014 | Lin et al. |
| 2014/0074743 A1 | 3/2014 | Rademaker |
| 2014/0089135 A1 | 3/2014 | Linh et al. |
| 2014/0156452 A1 | 6/2014 | Lupo |
| 2014/0164126 A1 | 6/2014 | Nicholas et al. |
| 2014/0180959 A1 | 6/2014 | Gillen et al. |
| 2014/0188637 A1 | 7/2014 | Balasubramaniam et al. |
| 2014/0188650 A1 | 7/2014 | Sun et al. |
| 2014/0214465 A1 | 7/2014 | L'Heureux et al. |
| 2014/0226487 A1 | 8/2014 | Forssell et al. |
| 2014/0343841 A1 | 11/2014 | Faaborg et al. |
| 2014/0370167 A1 | 12/2014 | Garden |
| 2015/0206093 A1 | 7/2015 | Trew et al. |
| 2015/0262121 A1 | 9/2015 | Riel-Dalpe et al. |
| 2015/0304436 A1 | 10/2015 | Vaccari et al. |
| 2018/0022405 A1 | 1/2018 | Gecchelin et al. |

OTHER PUBLICATIONS

Non-Final Office Action dated Jan. 12, 2018, for U.S. Appl. No. 14/813,358, of Kohli, A., filed Jul. 30, 2015.
Non-Final Office Action dated Jan. 18, 2018, for U.S. Appl. No. 14/985,267, of Rhodes, M., et al., filed Dec. 30, 2015.
Non-Final Office Action dated Jan. 26, 2018, for U.S. Appl. No. 14/838,446, of Kohli, A., filed Aug. 28, 2015.
Non-Final Office Action dated Nov. 9, 2017, for U.S. Appl. No. 14/625,673, of Reiss, J.L., et al., filed Feb. 19, 2015.
Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.
Kauffman, R.J., and Wang, B., "Bid Together, Buy Together: On the Efficacy of Group-Buying Business Models in Internet-Based Selling," Carlson School of Management, last revised on May 16, 2001, pp. 1-44.
Non-Final Office Action dated May 26, 2015, for U.S. Appl. No. 14/625,680, of Kumar, A.R., et al., filed Feb. 19, 2015.
Non-Final Office Action dated Jun. 24, 2015, in U.S. Appl. No. 14/663,671, of Reiss, J.L., et al., filed Mar. 20, 2015.
Notice of Allowance dated Nov. 6, 2015, for U.S. Appl. No. 14/625,680, of Kumar, A.R., et al., filed Feb. 19, 2015.
Final Office Action dated Dec. 24, 2015, in U.S. Appl. No. 14/663,671, of Reiss, J.L., et al., filed Mar. 20, 2015.
Advisory Action dated Mar. 9, 2016, in U.S. Appl. No. 14/663,671, of Reiss, J.L., et al., filed Mar. 20, 2015.
Non-Final Office Action dated Oct. 6, 2016, for U.S. Appl. No. 14/663,671, of Reiss, J.L., et al., filed Mar. 20, 2015.
Notice of Allowance dated Dec. 22, 2016, for U.S. Appl. No. 14/663,671, of Reiss, J.L., et al., filed Mar. 20, 2015.
Non-Final Office Action dated Feb. 1, 2018, for U.S. Appl. No. 14/993,149, of Kohli, A., et al., filed Jan. 12, 2016.
Non-Final Office Action dated Feb. 28, 2018, for U.S. Appl. No. 14/642,875, of Reiss, J.L., et al., filed Mar. 10, 2015.
Non-Final Office Action dated Mar. 8, 2018, for U.S. Appl. No. 14/663,678, of Reiss, J.L., et al., filed Mar. 20, 2015.
Non-Final Office Action dated May 18, 2018, for U.S. Appl. No. 14/978,307, of Kumar, A.R., et al., filed Dec. 22, 2015.

ADD-ON ORDERS FOR DELIVERY

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. After an order has been placed, the customer may sometimes want to add one or more additional items to the order. However, this may disrupt the preparation of the earlier order, may result in a separate new order, or may cause other complications that diminish the customer experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
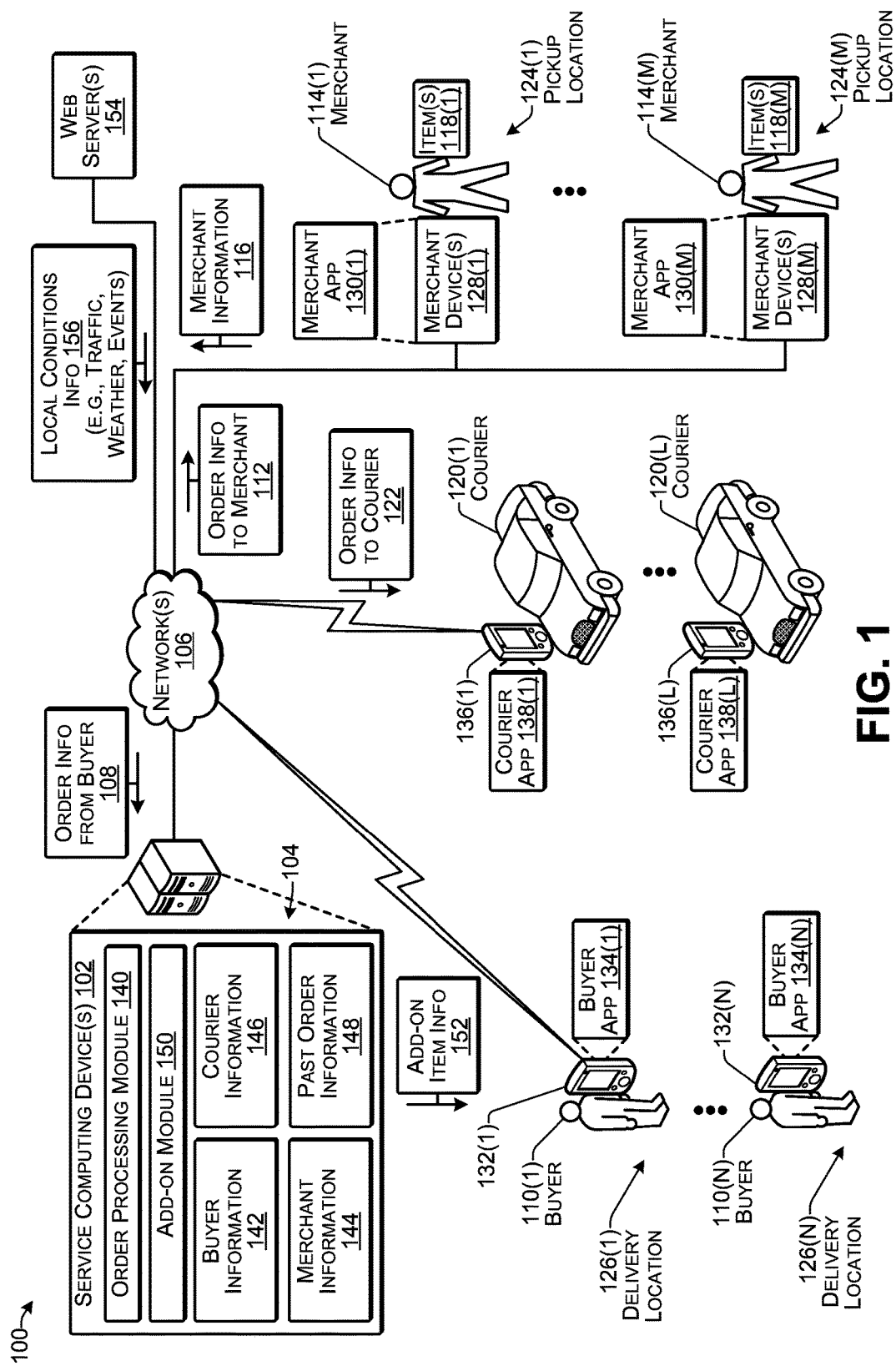
FIG. 1 illustrates an example system for enabling add-on orders according to some implementations.

The technology herein include novel arrangements and techniques for enabling buyers to remotely view and select items available to be added on to a delivery order that has already been placed. For example, a buyer may place a first order for a first item through a buyer application on a buyer device. A service provider may send the order information to a merchant who will prepare the first item for delivery to the buyer. Following placement of the first order for the first item, the service provider may send to the buyer device information about add-on items that are still available to be added-on to the first order. For instance, by combining the add-on items with the first order, rather than creating a new order, the added-on items may be delivered with the first item and the buyer may be able to avoid payment of additional delivery fees.

The buyer device may present received information about the one or more add-on items available to be added to the order in a graphic user interface (GUI). As time elapses following placement of the first order, certain ones of the add-on items may be removed or otherwise indicated to be no longer available in the GUI presented on the buyer device. For example, the service provider may determine a preparation time for the first order and respective preparation times for the add-on items. As the preparation time for each add-on item exceeds the remaining preparation time for the first order, those add-on items may be indicated in the user interface to be no longer available for ordering as an add-on item. In some examples, the user interface may present a countdown of the time remaining for the buyer to place an order for each add-on item before the add-on item becomes unavailable for ordering as an add-on.

In some examples, the service provider may be in communication with a plurality of merchant devices associated with a plurality of respective merchants. The service provider may receive, from each merchant device, an indication of a current load on the merchant, such as the number of orders that the merchant is currently preparing or will be preparing in the near future. For instance, the service provider may receive an indication of a total number of orders that have been received by the merchant, including delivery orders, walk-in orders, or other types of orders. Thus, when determining the preparation time for the first item ordered and for the add-on items, the service provider may take into consideration the current load on the particular merchant. Accordingly, the service provider may receive feedback from the merchant device regarding current orders, current prep times, and/or current inventory of the particular merchant.

In addition, in some examples, the service provider may send, to the buyer device, information for add-on items available from merchants different from the first merchant with whom the first order is placed. For example, the service provider may determine a first set of one or more other merchants who are within a threshold distance of the pickup location of the first merchant. The threshold distance may be determined based on the courier being able to pick up items at both merchant locations within a short period of time, such as less than 5 minutes. Accordingly, the add-on items available to be added on to the first order may also include add-on items from a different merchant who is within the threshold distance of the first merchant.

Furthermore, the service provider may determine a second set of one or more other merchants who are located along, or otherwise within a threshold proximity of, a predicted travel route of the courier from the pickup location of the first merchant to the delivery location of the buyer. For example, suppose that a second merchant is located along the travel route of the courier and further suppose that the predicted travel time from the pickup location of the first merchant to the pickup location of the second merchant is ten minutes. Accordingly, the amount of time that the buyer has to select the add-on item offered by the second merchant may be calculated based on the remaining preparation time for the first item plus the predicted courier travel time from the first merchant pickup location to the second merchant pickup location, minus the preparation time for the add-on item offered by the second merchant. Consequently, according to the techniques herein, the number of items available as add-on items may be greatly increased as compared to the number of add-on items available from just the first merchant.

The technology herein provides a novel system and environment in which buyers, who have placed an order for delivery, may be able to order one or more additional items that later may be added on to the first order, such as without any additional delivery charge for the added on items. For instance, a buyer who has placed an order for a first item may be presented with the opportunity to order selected add-on items from the same merchant based on predicted preparation times for the first item and the add-on items. Additionally, in some examples, the buyer may be able to order add-on items from other selected merchants based on proximity to the first merchant, and/or proximity to a predicted courier travel route, and/or based on predicted courier travel times from the first merchant location to the other merchant locations, and to the delivery location.

Additionally, some implementations herein provide technological innovations that enable people to participate as couriers in a new type of crowdsourced service economy. With the technology herein, essentially any person with a mobile device is able to immediately become a courier, or cease to be a courier, in a courier network that provides delivery services for delivery of items from merchants to buyers. Additionally, through the interaction of the plurality of computing devices, mobile devices, and location sensors, implementations herein are able to determine the delivery locations of buyers and/or track the movement of couriers throughout a service region over time, and can use this information to assist in predicting courier travel times to various delivery locations and/or to and from various merchant pickup locations.

As used herein, an order may include a request submitted by a buyer for the acquisition of food items and/or other goods (referred to herein as items) from a merchant. An add-on item may include an item that is added by a buyer to an order that has already been received by the service provider. Further, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of enabling buyers to place orders with merchants for delivery, such as to enable a buyer to add one or more items to an order that has already been submitted. However, implementations herein are not limited to the particular examples provided, and may be extended to other service environments, other system architectures, other types of goods, and so forth, as will be apparent to those of skill in the art in light of the disclosure herein.

FIG. 1 illustrates an example system 100 enabling add-on orders according to some implementations. The system 100 includes one or more service computing devices 102 of a service provider 104 that may receive, over one or more networks 106, order information 108 from a plurality of buyers 110(1)-110(N). The order information 108 may include information about at least one order placed by at least one of the buyers 110. Further, the order information 108 may include subsequent order information for one or more add-on items to be added to an order already placed. Based on the order information 108 received from a particular buyer 110, the service computing device 102 may send order information 112 to a particular merchant 114 of a plurality of merchants 114(1)-114(M). The particular merchant 114 may receive the order information 112 and may respond with merchant information 116. For instance, the merchant information 116 may include confirmation information to confirm that the particular order has been received and will be prepared by the responding merchant 114.

The order information 112 sent to the merchant 114 may identify one or more items 118 ordered by the buyers 110 from the particular merchant 114. For instance, each merchant 114(1)-114(M) may offer one or more respective items 118(1)-118(M), which may be ordered by buyers 110 for delivery. In some cases, the order information 112 may also specify a time at which the order is to be picked up by a courier 120 of a plurality of couriers 120(1)-120(L). For instance, the service provider 104 may predict the preparation time for the order, and the merchant information 116 sent by the merchant 114 to the service computing device 102 may indicate the predicted preparation time is correct and/or may confirm the pickup time specified by the service computing device 102. In other examples, the order information 112 sent to the merchant 114 may include an inquiry as to when the order will be prepared and ready for pick up, and the merchant 114 may include with the merchant information 116 a predicted preparation time and/or a specified time at which the order will be ready for pickup.

In either event, in response to receiving the merchant information 116 from the particular merchant 114, the service computing device 102 may send order information 122 to a particular courier 120 who will pick up the order from the particular merchant 114 and deliver the order to the buyer 110 who placed the order. For instance, each merchant 114(1)-114(M) may be associated with a respective pickup location 124(1)-124(M), which may typically be the merchant's place of business. Furthermore, each buyer 110(1)-110(N) may be associated with a respective delivery location 126(1)-126(N) to which orders are to be delivered.

The order information 122 sent to the courier 120 may include the pickup location 124 for the order, the pickup time, and the delivery location 126 for the order. In some examples, the order information 122 may further include a contract time, i.e., a delivery time by which the service provider 104 has agreed to have the ordered item(s) 118 delivered to the buyer 110 at the delivery location 126. Further, in some cases, the order information 122 may include an amount that the courier 120 will be paid if the courier 120 accepts the delivery job, and/or other information related to the order.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the merchant information 116. In some examples, the merchant application 130 and the service computing device 102 may communicate with each other via one or more application programming interfaces (APIs).

Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments from walk-in customers using the merchant device 128. Alternatively, in some examples, the merchant device 128 may include a fax machine and the merchant 114 may receive the order information 112 via a facsimile transmission from the service computing device 102. As still another example, the merchant device 128 may include a computing device that is configured to receive order information via email, instant messaging, or other electronic communication. As still another example, the merchant device 128 may include a phone, and the merchant device 128 may receive the order information 112 via an SMS text message, voicemail, telephone call, or the like.

In some examples, the merchant application 130 may keep track of orders received by the respective merchant 114. For example, the merchant 114 may receive orders for delivery from the service computing device 102. The merchant 114 also may receive orders from customers who walk in to the merchant's place of business and/or place orders to eat in or carry out. Thus, the merchant information 116 sent to the service computing device 102 may indicate a current load for each merchant 114 based on the number of orders received by the merchant 114 over any given time. The service computing device 102 may use this merchant load information when calculating preparation times for ordered items and add-on items.

In addition, in some cases, the merchant information 116 may include inventory information for the respective merchant. For instance, if a particular merchant is out of a particular item, the item information and/or add-on item information sent to the buyers may exclude any items that are not currently in inventory and/or indicate that these items are not currently available for ordering.

In addition, the buyers 110(1)-110(N) may be associated with respective buyer devices 132(1)-132(N) that may execute respective instances of buyer applications 134(1)-134(N). For example, buyers 110 may use buyer devices 132, such as smart phones, tablet computers, wearable computing devices, laptops, desktops, or the like, and these buyer devices 132 may have installed thereon the buyer application 134. The buyer application 134 may enable the buyer 110 to select one or more of the items 118 to purchase from one or more of the merchants 114 to be delivered to the buyer 110 by one or more of the couriers 120. For example, the buyer application 134 may present one or more GUIs on a display for enabling the buyer 110 to select one or more of the items 118 for an order.

In some cases, the delivery location of the buyer may be determined by a GPS (Global Positioning System) receiver (not shown in FIG. 1) or other location sensor onboard the buyer device 132, and this location information may be transmitted to the service computing device as the indicated delivery location. Accordingly, the system 100 may employ a plurality of computing devices, mobile devices, and location sensors to provide a novel technological arrangement that provides buyers varying options for ordering add-on items from merchants based at least in part on delivery location, as discussed additionally below.

Further, the buyer application 134 may enable the buyer 110 to place an order from a merchant 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day. Subsequently, when the merchant starts preparation of the order at the later point in time, the buyer may be invited, such as through an in-application notification, email, or other electronic communication, to order one or add-on items for the order at that time.

The buyer application 134 may further enable the buyer 110 to make a payment for an order and any add-on orders using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. Thus, in this case, the website may provide at least some of the functionality attributed to the buyer application 134 herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, and these courier devices 136 may have installed thereon the courier application 138. The courier application 138 may be configured to receive the order information 122 from the service computing device 102 to provide a particular courier 120 with information for picking up a particular order from a merchant's pickup location 124 and for delivering the order to a buyer delivery location 126. The courier application 138 may further enable the courier 120 to respond to the service computing device 102 to confirm acceptance of a delivery job.

Additionally, in some cases, the courier application 138 may provide the service computing device 102 with an indication of a current location of a particular courier 120. For instance, one or more location sensors associated with each courier device 136 of an active courier 120 may provide location information and, based on this, the courier application 138 may send location information to the service computing device 102, such as by providing an indication of a geographic location of each courier device of each active courier. Thus, a subset of courier devices 136 associated with active couriers may communicate with the service computing device 102, and may send location information obtained from one or more location sensors associated with each courier device 136, such as a GPS receiver (not shown in FIG. 1).

In some cases, another subset of courier devices 136 associated with the inactive couriers may be periodically pinged by the service computing device 102 to determine interest in becoming active and, if so, requesting current location information of the associated inactive courier. Couriers who are interested in being activated may allow their courier devices 136 to respond with their location information, while those who are not interested in being activated may keep their location information private by not responding. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or short-range wireless communications, such as BLUETOOTH® and BLUETOOTH® low energy; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the order processing functionality attributed to the service computing device 102. The order processing module 140 may receive the order information 108 from the buyers 110 and may associate the order information 108 with buyer information 142 and merchant information 144. For instance, based on buyer identifying information that may be included with the order information 108, the order processing module 140 may associate particular order information 108 with a particular buyer account. The order processing module 140 may access a buyer account included in the buyer information 142 to charge a particular buyer account for a particular order.

Furthermore, based on a particular merchant 114 identified by the order information 108, the order processing module 140 may associate the order information 108 with a merchant account of a particular merchant 114. The order processing module 140 may access the merchant account, which may be identified in the merchant information 144, to determine contact information for sending the order information 112 to the correct merchant device 128 so that the particular merchant 114 can receive and provide confirmation of the order. The order processing module 140 may further access the merchant account of the particular merchant 114 to credit payment to the particular merchant that prepares the order.

In addition, the order processing module 140 may access courier information 146 to determine courier contact information for sending the order information 122 to a particular courier 120 of the plurality of couriers 120(1)-120(L) to determine whether the particular courier 120 is willing to accept the delivery job of delivering the order to the buyer. The particular courier 120 may use the courier application 138 on the courier device 136 to receive a message with information about the order, and to respond with acceptance of the delivery job if the job assignment is accepted. The particular courier 120 may subsequently pick up the order from the particular merchant 114 and deliver the order to the particular buyer 110 at a specified delivery location 126. When the courier 120 has completed delivery of the order to the delivery location 126, the courier 120 may use the courier application 138 to inform the order processing module 140 that the delivery has been completed. The order processing module 140 may access a courier account included in courier information 146 for the particular courier 120 to credit the courier account of the particular courier 120 with payment for the delivery job.

The order processing module 140 may store information associated with each order as past order information 148. For instance the past order information 148 may include a day of the week, date, and time of day at which each order is received from the respective buyer 110. The past order information 148 may further include, for each order: merchant identifying information; buyer identifying information; items ordered; the pickup location 124; the delivery location 126; preparation time for the order; location of the courier when the courier accepted the job for delivery of the order; predicted spoilage time for one or more items; time that the order was picked up by the courier; time that the order was delivered; amount paid for the order; feedback including records of any complaints or indications of spoilage; as well as other information, as discussed additionally below.

The service computing device 102 may further include an add-on module 150 that may be executed by the service computing device 102 to determine add-on items offered by one or more of the merchants based at least in part on an estimated preparation time for one or more items that have already been ordered and further based on an estimated preparation time for each of the potential add-on items. For example, when placing an order for a first item 118 from a particular merchant 114, the buyer 110 may use the buyer application 134 to place the order. The order for the first item may be received by the service computing device 102 and sent by the order processing module 140 as order information 112 to the corresponding merchant device 128 of a first merchant 114 who will prepare the order.

The add-on module 150 may determine a predicted preparation time for the first item such as based on the past order information 148 and/or based on the merchant information 116 received from the merchant device 128. For instance, as mentioned above, the add-on module 150 may determine the predicted preparation time for the first item from past order information 148 that indicates how long the first merchant 114 has taken to prepare similar items in the past. In some examples, the merchant information 116 may include an indication of a current load on the merchant (e.g., a number of orders received and still to be prepared), and this may be used when determining the predicted preparation times by determining past preparation times under similar loads. Additionally, or alternatively, the merchant information 116 provided to the service computing device 102 from the merchant device 128 may include a predicted preparation time for the first item, as determined by the merchant.

Further, the add-on module 150 may determine predicted preparation times for items that may be offered as add-on items available from the merchant 114. For instance, practically any item offered by the merchant 114 having a preparation time less than the predicted preparation time of the first item may be available initially as an add-on item. As time elapses following receipt of the first order by the service computing device 102 and sending of the order information 112 to the merchant device 128, items having predicted preparation times longer than the remaining preparation time for the first item are no longer available as add-on items.

In some examples, the add-on module 150 may employ, at least in part, the past order information 148 to determine predicted item preparation times for ordered items and/or items offered as add-on items. Thus, the add-on module 150 may determine, for a plurality of different times of day for a plurality of different days, and for a plurality of orders received for items provided by individual merchants over a past period of time, e.g., a past month, past two months, past year, etc., the actual preparation times for particular items offered by each merchant 114(1)-114(M).

Furthermore, in some examples, the predicted preparation times for the add-on items may be determined based on merchant information 116 received from the merchant device 128 of the corresponding merchant, which may indicate a current load on the corresponding merchant. For instance, the add-on module 150 may receive an indication of a current load on the particular merchant based on not only delivery orders received by the particular merchant but also walk-in orders or other types of orders received by the particular merchant and still to be prepared. For example, if the particular merchant is currently very busy, the preparation times for the first item and the add-on items may be predicted to be longer than if the merchant is not very busy. Accordingly, the merchant information 116 received from the merchant device 128 may indicate a current number of orders of all types that the particular merchant has received. Comparing this merchant load information with the past order information 148, such as past preparation times for particular items when the merchant load was similar, may be used to provide an indication of the predicted preparation times for each of the add-on items available from the particular merchant 114.

Additionally, if a particular merchant has run out of a particular item, this may be indicated by merchant inventory information received from the particular merchant by the service provider. Accordingly, the service provider may not include that particular item in the item information sent to the buyer device regarding the available add-on items, or may otherwise indicate the particular item to be unavailable. For instance, the service provider may receive inventory information from the merchant device on a regular basis, such as when any inventory item is getting low or is fully depleted. In some cases, the service provider may also perform a wholesale ordering function on behalf of particular merchants to restock certain items when the inventory for those items falls below a threshold level. In some examples, the service provider may determine that the inventory for an item is above a threshold level (e.g., greater than or equal to one) before sending information about the item to a buyer device.

After the add-on module 150 has determined one or more available add-on items having predicted preparation times that are less than the remaining predicted preparation time of the first item, the add-on module 150 may send add-on item information 152 to the buyer device 132 of the buyer 110 who placed the first order. As one example, the add-on module 150 may send an initial push notification, such as an in-application notification, an email, a text message, or other electronic communication, about available add-on items with an order confirmation that confirms placement of the first order. Subsequently, if the buyer 110 accesses the buyer application 134, the buyer application may present a GUI that displays information about the add-on items and the remaining time (e.g., a countdown) that the buyer 110 has left for placing an add-on order for particular add-on items or categories of add-on items. For example, certain items that typically have the same preparation times may be categorized into preparation time categories, e.g., 1 minute items, 5 minute items, 7 minute items, 10 minute items, etc., to simplify the process of determining time thresholds for items and the like. For example, a bag of chips may typically be a 1 minute item, regardless of the type of chip.

In addition, in some examples, add-on items may be made available from other merchants 114 that are different from the first merchant 114 with whom the original order is placed. For example, the add-on module 150 may determine one or more other merchants having pickup locations 124 within a threshold distance of the pickup location 124 of the first merchant. The add-on module 150 may further determine whether these other merchants have any items available for preparation within a time limit corresponding to the remaining amount of preparation time of the first order. If so, these items may also be presented as available add-on items in the buyer application GUI.

As another example, the add-on module 150 may determine a travel route that may be traveled by the courier 120 from the first merchant pick up location 124 to the buyer's delivery location 126, such as a travel route corresponding to a shortest courier travel time. In addition, the add-on module 150 may determine one or more other merchants 114 located on the travel route or otherwise within a threshold proximity of the travel route. Accordingly, the add-on module 150 may determine items available from these other merchants while taking into consideration the remaining preparation time of the first item plus the travel time of the courier from the first merchant to the one or more merchants located along the route. For example, the predicted courier travel time from the first merchant pick up location to the other merchant pickup location may be added to the remaining preparation time for the first item so the buyer has additional time in which to place an order for an add-on item from the other merchant. The add-on module 150 may also send add-on item information 152 about these items from other merchants to the buyer device 132 for presentation to the buyer 110 as indicated available add-on items.

When determining predicted courier travel times, the add-on module 150 may take into consideration actual travel times determined from the past order information 148 and various other considerations, such as current traffic, weather, local events, day of the week, etc. As one example, the add-on module 150 may access one or more web servers 154 or other databases over a network, or other sources of information, to obtain local conditions information 156, such as traffic, weather, local events, road closures, construction, and the like, for a current or future day. As another example, current traffic conditions may be determined based in part on information received from the courier devices 136, such as by tracking movement of the courier devices 136 within the service region over time through location information received from the GPS receiver onboard each courier device 136, or the like. For instance, the courier device 136 may be programmed by the courier application 138 to periodically report a current location to the service computing device 102.

In addition, the buyer application 134 may present a GUI (not shown in FIG. 1) on the buyer device 132 that enables the buyer 110 to browse through the add-on items available from at least the first merchant. Prior to presenting the add-on item information in the GUI, the buyer application 134 may receive, from the service computing device 102, the add-on item information 152 about the various add-on items the buyer is able to select. A time limit associated with ordering each add-on item may also be presented in the GUI. If the buyer selects a particular add-on item prior to expiration of the associated time limit, the selected add-on item may be added to the buyer's original order. The order processing module 140 may receive the selection of the add-on item and may send the order information to the corresponding merchant. In addition, the order processing module 140 may send, to the courier device 120, additional order information 122 indicating that the add-on item is to be picked up with the first item from the pickup location and delivered to the delivery location with the first item. Accordingly, the selected add-on item may be delivered to the buyer by the same courier that delivers the first item. Further, in some examples, the buyer may be charged a single delivery fee for the order, thus avoiding an additional delivery fee that may have been charged in if the add-on item had been ordered separately from the first order.

Figure 2:
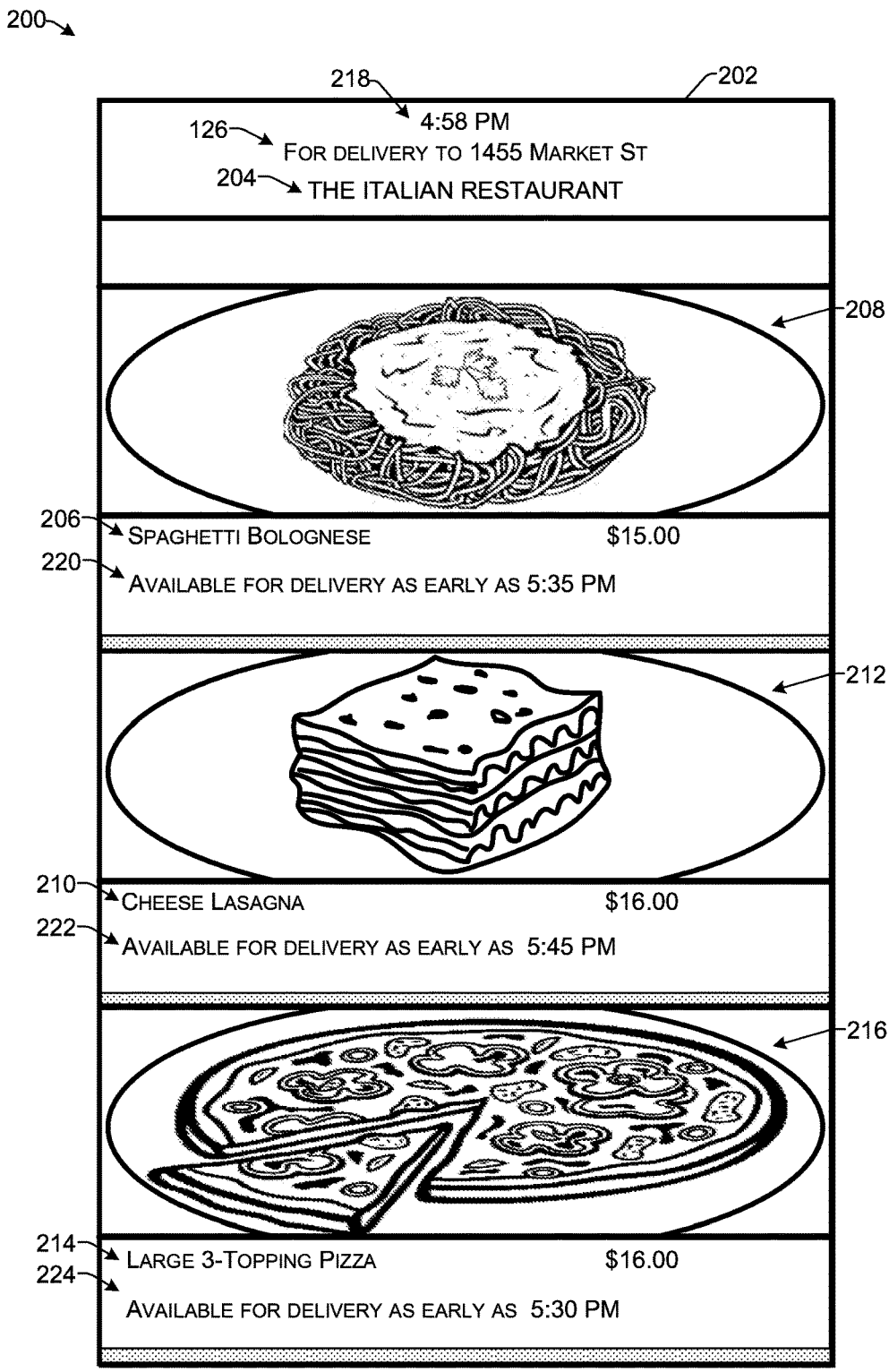
FIG. 2 illustrates an example graphic user interface for presentation on a buyer device according to some implementations.

FIG. 2 illustrates an example GUI 200 presenting merchant information on a display 202 associated with the buyer device 132 according to some implementations. In this example, suppose that the user has selected, from a plurality of available merchants, a particular merchant, i.e., "The Italian Restaurant" to browse items available for ordering from this merchant. The GUI 200 may present the name 204 of the selected merchant. The GUI 200 may further present a plurality of items available from the selected merchant, such as a name/price 206 and a representative image 208 of a first item, "Spaghetti Bolognese"; a name/price 210 and representative image 212 of a second item, "Cheese Lasagna"; and a name/price 214 and representative image 216 of a third item, "Large 3-Topping Pizza". Further, while three items are illustrated in the GUI 200 in this example, numerous other items may be available from the selected merchant and may be viewed, e.g., by scrolling or otherwise traversing through the GUI 200.

In addition, the GUI 200 may include a delivery location 126, such as an address to which the order is to be delivered. For example, when the buyer opens or otherwise accesses the buyer application 134, the buyer application 134 may initially request that the buyer indicate the desired delivery location 126. The buyer application 134 may send this information to the service computing device 102. In some cases, the delivery location 126 may be the current location of the buyer device 132, which may be determined at least in part by one or more location sensors, such as a GPS receiver (not shown in FIG. 2) onboard the buyer device 132. In other cases, the buyer 110 may enter an address as the delivery location, may proceed with a default address, may select a previously used address, or the like. Further, the buyer application 134 may, by default, assume that the buyer is interested in ordering now for immediate delivery, i.e., as soon as the order can be prepared and delivered. If the buyer prefers a later delivery time or date, the buyer may select one or more options in the GUI to select a later time or day, and this time information may be sent to the service computing device 102 with the delivery location information.

In the illustrated example, current time is indicated at 218 to be 4:58 PM, and the GUI 200 further indicates at 220 that the Spaghetti Bolognese may be delivered by 5:35, e.g., about 35 minutes; indicates at 222 that the Cheese Lasagna may be delivered by 5:45, e.g., about 45 minutes; and indicates at 224 that the Pizza may be delivered by 5:30, e.g., about 30 minutes. For example, the service provider may determine a predicted courier travel time from the merchant pickup location to the delivery location 126, e.g., by taking into consideration current local conditions. Further, the service provider may determine a preparation time for each item, and may add the preparation time to the predicted courier travel time to determine the predicted delivery time for each item to the delivery location 126.

In some examples, when determining the courier travel predicted courier travel time, the add-on module 150 may take local conditions taken into consideration, such as current traffic, weather, and local events. As one example, suppose that the current time is 4:58 PM and the buyer is using the buyer application on the buyer device 132 to order dinner. The buyer application may receive merchant and/or item information from the order processing module on the service computing device, and may present the merchant information and the respective items available from each merchant.

To place an order, the buyer may select the name or the representation of one or more of the items, such as by tapping on a particular item representation or by tapping on an area of the display 202 associated with the particular item. The buyer may then subsequently be presented with a pop-up window, a separate GUI, or the like (not shown in FIG. 2), asking the buyer to select or confirm a delivery time interval and price for the selected item. Accordingly, the buyer may select any of the available items to be delivered. In this example, suppose that the buyer selects the Spaghetti Bolognese for delivery. In response to the buyer selection, following confirmation that the buyer intends to order the Spaghetti Bolognese, the buyer device may send the information about the buyer's selection to the service computing device. The service computing device may receive the buyer's selection and send order information about the buyer's selection to the merchant device of the corresponding merchant, i.e., in this case, the Italian Restaurant. For example, the order information may be sent directly to the particular merchant device and queued by the merchant application with other orders that are received by the Italian Restaurant.

Figure 3:
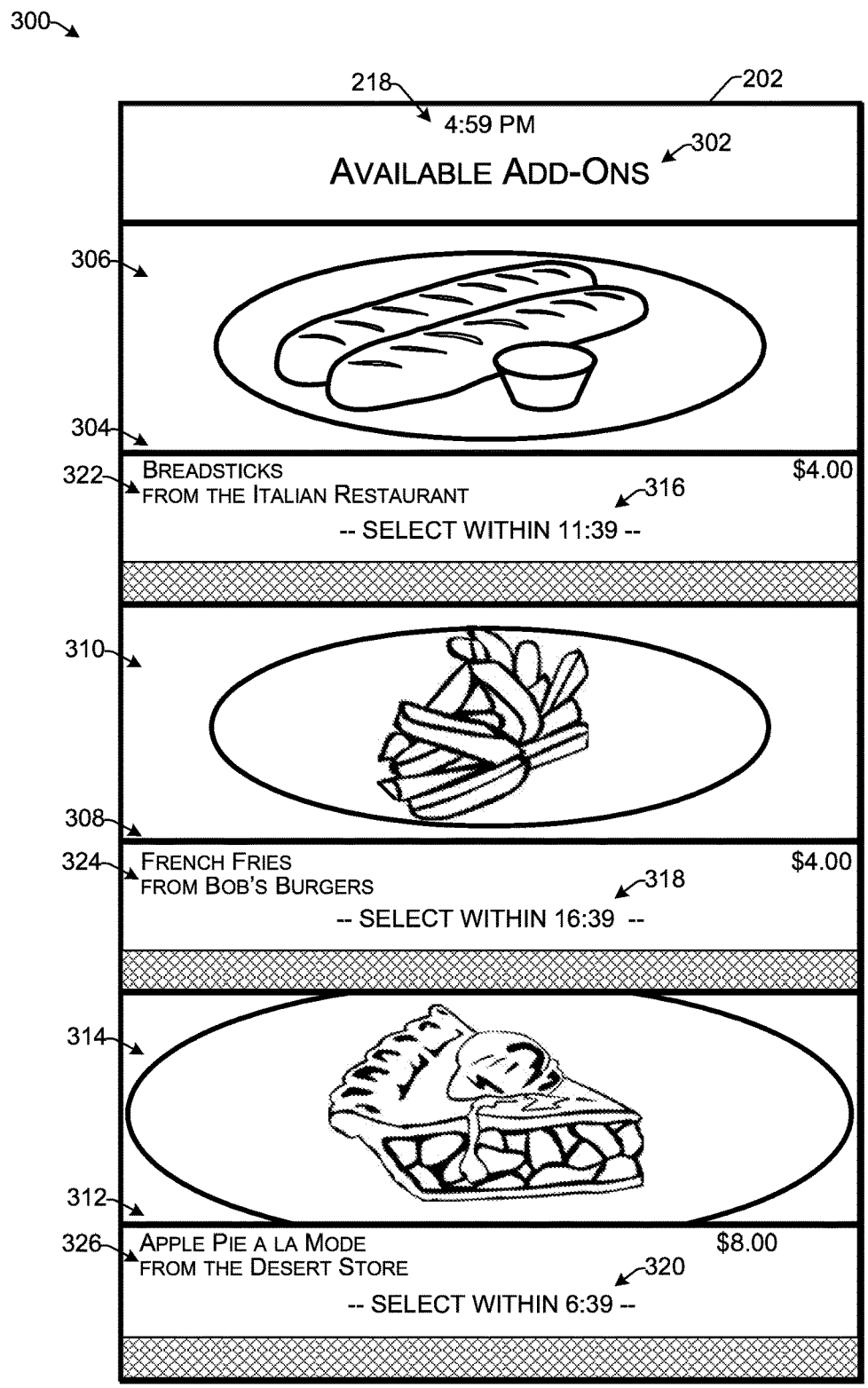
FIG. 3 illustrates an example graphic user interface for presentation on a buyer device according to some implementations.

FIG. 3 illustrates an example graphic user interface 300 for presentation of available add-on items on a buyer device according to some implementations. For example, after the buyer has selected one or more items for a first order, as discussed above with respect to FIG. 2, the service provider receives the first order and sends the order information to merchant device of the Italian Restaurant. Further, the add-on module may determine a predicted preparation time for the one or more ordered items based on merchant information received from the merchant device of the Italian Restaurant, such as merchant load information, and/or based on the past order information, as discussed additionally below with respect to FIG. 5. For instance, if multiple items are ordered, then the preparation time for the first order is the longest preparation time of the items ordered. In addition, the add-on module may also determine predicted preparation times for other items offered by the Italian Restaurant. Further, the add-on module may determine other merchants within a threshold distance of the Italian Restaurant, and may determine items offered by these other merchants that can be prepared within the preparation time for the first order.

In addition, the add-on module may determine a predicted courier travel route from the Italian Restaurant pickup location to the delivery location, and may determine any merchants within a threshold proximity of the predicted courier travel route, e.g., threshold distance and/or travel time. The add-on module may also determine items offered by these merchants that can be prepared within the preparation time for the first order plus a predicted travel time from the Italian Restaurant pickup location to the pickup locations of these merchants.

After the add-on module has determined add-on items available from the Italian Restaurant, from merchants within the threshold distance of the Italian Restaurant, and/or from merchants within the threshold proximity of the courier travel route, the add-on module may send the add-on item information to the buyer device, such as with a confirmation of receipt of the first order. In response, if the buyer accesses the buyer application to view the available add-on items, the buyer device may present the GUI 300. The GUI 300 includes menu information associated with add-on items available to be ordered from individual merchants having respective predicted preparation times less than a time limit that applies to the particular merchants, and which is based on the preparation time of the first order.

In the illustrated example, the GUI 300 includes a listing 302 of available add-on items that the buyer may add to the first order, such as breadsticks 304 and an associated image 306, French fries 308 and associated image 310, and apple pie 312 and associated image 314. Further, while three items are illustrated in the GUI 300 in this example, numerous other items may be available for selection as add-on items, and may be viewed, e.g., by scrolling or otherwise traversing through the GUI 300.

In this example, a threshold time is associated with each add-on item presented in the GUI 300. For instance, a first threshold order time 316 may indicate an amount of time remaining for the buyer to order the breadstick add-on item 306; a second threshold order time 318 may indicate an amount of time remaining for the buyer to order the French fry add-on item 308; and a third threshold order time 320 may indicate an amount of time remaining for the buyer to order the apple pie add-on item 312 as an add-on to the first order. Further, other add-on items that are not currently visible in the GUI 300 in this example may also have respective times associated therewith remaining for the buyer to order those items as add-on items. For instance, as time elapses, the remaining time for the buyer to order the add-on items may decrease in real time. As time runs out for a particular add-on item, that add-on item may be removed from the list 302 of available add-on items, or may be otherwise indicated to be no longer available for ordering as an add-on item that can be added on to the first order. Accordingly, each of the threshold order times 316-320 may be provided as a real-time countdown of the time remaining for the buyer to place an order for the associated add-on item.

Furthermore, in some examples, the GUI 300 may indicate from which merchant each add-on item is available. Accordingly, the breadsticks 304 are indicated to be from the Italian restaurant 322, the French fries 308 are indicated to be from Bob's Burgers 324, and the apple pie 312 is indicated to be from the Desert Store 326. Alternatively, in other examples, the GUI 300 may not indicate which merchant is providing which add-on item.

As discussed above, for add-on items available from the merchant with whom the first order is placed, i.e., the Italian Restaurant in this example, the time remaining for placing an order for a particular item to be added on to the first order may be determined based on the difference between the remaining preparation time for the first order and the preparation time for the particular add-on item. Thus, suppose that there are 14 minutes and 39 seconds remaining in the preparation time predicted for the first order. For instance, the preparation time may include food cooking time plus time for packaging the item for transport. Furthermore, suppose that the preparation time for breadsticks is two minutes since this item is normally prepared in batches, and thus the preparation time typically merely involves packaging the breadsticks for transport. Furthermore, for the add-on items, the presented times may include an additional default time, e.g., one minute, that is included to take into account the time for the buyer to confirm the add-on order and for the add-on order to be sent to and confirmed by the corresponding merchant. Accordingly, in this example the time remaining for the buyer to place an order for the breadsticks 304 as an add-on item is the remaining preparation time for the first item i.e., 14 minutes and 39 seconds, minus the preparation time for the breadsticks, i.e., 2 minutes, minus the default time, i.e., 1 minute, which results in a remaining threshold time of 11 minutes and 39 seconds for the buyer to place an order for the breadsticks 304 as an add-on item to be added on to the first order.

Further, the remaining time for items available from merchants within a threshold distance to the Italian Restaurant may be calculated similarly, since the time for the courier to pick up the first item from the Italian Restaurant, and the additional time for the courier to pick up an add-on item from a merchant within a threshold distance to the Italian Restaurant may be a short amount of time, such as several minutes or less of travel time. In this example, suppose that the Dessert Store, which offers apple pie a la mode 312, is next door to the Italian Restaurant. In some examples, the travel time from the first merchant to the proximate merchant may be added to the remaining time, while in other examples, the travel time may be disregarded as de minimis, such as in the case that the travel time is only one or two minutes, or less. Furthermore, suppose that the predicted preparation time for the apple pie 312 is seven minutes. Accordingly, the remaining threshold time 320 for the buyer to select the apple pie 312 as an add-on to the first order may be 14:39 remaining preparation time, minus 7 minutes preparation time for the apple pie 312, minus 1 minute default time, which results in a remaining time of 6 minutes and 39 seconds for the buyer to place an order for the apple pie 312 as an add-on item to be added on to the first order.

Additionally, suppose that Bob's Burgers is a merchant that is located along a route that the courier is predicted to travel from the Italian restaurant to the delivery location of the buyer. Consequently, the remaining time calculated for items available from merchants within a threshold proximity of the travel route of the courier may include an additional amount of time that it will take for the courier to travel from the pickup location of the Italian Restaurant to the pickup location of the merchant proximate to the travel route. In this example, suppose that the Bob's Burgers, which offers French fries 308, is ten minutes of travel time from the pickup location of the Italian restaurant. Furthermore, suppose that the predicted preparation time for the French fries 308 is seven minutes. Accordingly, the remaining time 318 for the buyer to select the French fries 308 as an add-on to the first order may be 14:39 remaining preparation time, minus 7 minutes preparation time for the French fries 308, minus 1 minute default time, plus 10 minutes of courier travel time, which results in a remaining threshold time 318 of 16 minutes and 39 seconds for the buyer to place an order for the French fries 308 as an add-on item to be added on to the first order.

Figure 4:
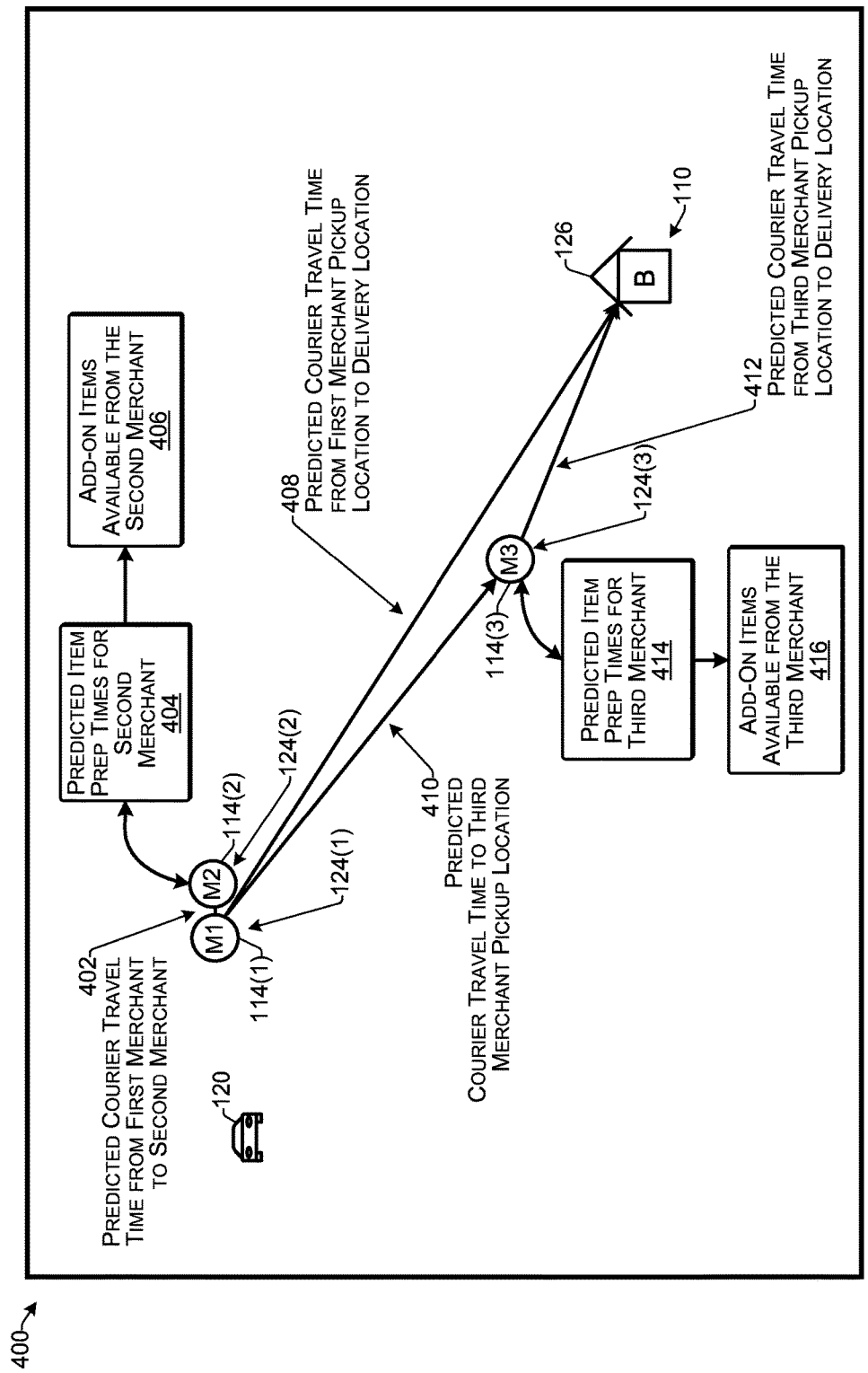
FIG. 4 illustrates an example of determining additional merchants able to offer add-on items for an order according to some implementations.

FIG. 4 illustrates an example 400 of determining add-on items available from other merchants according to some implementations. In this example, following receipt of an order from a buyer 110 for a first item to be prepared by a first merchant 114(1), the add-on module may determine one or more second merchants 114(2) having a pickup location 124(2) within a threshold distance of the pickup location 124(1) of the first merchant 114(1). For instance, as mentioned above, the threshold distance may be determined based on a predicted courier travel time 402 from the first pickup location 124(1) to the second pickup location 124(2) being less than a threshold time, such as five minutes or less, which may be inclusive of time to enter the pickup location 124(2) and obtain an item. As one consideration, the threshold distance (and/or threshold proximity discussed below) may be selected to not add a substantial additional burden to the courier and/or to not add substantial additional travel time from the first pickup location to the delivery location.

In response to identifying a second merchant 114(2), the add-on module may determine predicted item preparation times 404 for the items offered by the second merchant 114(2). The add-on module may then determine add-on items 406 available as add-on items from the second merchant 114(2) by determining items having predicted preparation times 404 that are less than the remaining preparation time of the first item ordered from the first merchant 114(1). Accordingly, the add-on module may include item information about the add-on items 406 when providing the add-on item information to the buyer device as discussed above with respect to FIGS. 1-3.

In addition, following receipt of the first order for the first item to be prepared by the first merchant 114(1), the add-on module may determine one or more third merchants 114(3) within a threshold distance of a courier travel route that the courier 120 will travel from the pickup location 124 of the first merchant to the delivery location 126 of the buyer 110. In some examples, rather than mapping out a particular route and determining relative distances of each merchant to the route, the add-on module may determine a predicted courier travel time 408 from the pickup location 124 of the first merchant to the delivery location 126 of the buyer. Further, the add-on module may determine a pickup location 124(3) for each third merchant 114(3). The add-on module may determine a predicted courier travel time 410 from the first pickup location 124(1) to the third pickup location 124(3) associated with the third merchant, and a predicted courier travel time 412 from the third pickup location 124(3) to the delivery location 126. Next, the add-on module may determine a difference between the predicted courier travel time 408 and a sum of the predicted courier travel time 410 plus the predicted courier travel time 412 (i.e., difference=(travel time 410+travel time 412)−travel time 408). If the difference is less than a threshold amount, e.g., 5 minutes, then the third merchant 114(3) may be deemed to be within the threshold proximity of the courier travel route between the first pickup location 124(1) and the delivery location 126.

In response to identifying a third merchant 114(3) within the threshold proximity, the add-on module may determine predicted item preparation times 414 for the items offered by the third merchant 114(3). The add-on module may then determine add-on items 416 available as add-on items from the third merchant 114(3) by determining items having predicted preparation times 414 that are less than the remaining preparation time of the first item ordered from the first merchant 114(1) plus the predicted courier travel time 410 from the first pickup location 124(1) to the third pickup location 124(3) (i.e., (remaining prep time of first item+ travel time 410)>preparation time 414 of item 416 from third merchant). Accordingly, the add-on module may include item information about the add-on items 416 when providing the add-on item information to the buyer device as discussed above with respect to FIGS. 1-3.

Furthermore, when determining courier travel times, the add-on module may take into consideration actual travel times determined from the past order information 148 and various other factors, such as traffic, weather, local events, date, etc. Based at least in part on these considerations, the add-on module may predict courier travel times between pickup locations 124 of various merchants and/or the delivery location 126 of the buyer 110. Additionally, there may be a plurality of couriers 120 in the service region. In some examples, the movements of the couriers 120 within the service region may be tracked by the service computing device, such as for determining current traffic conditions within the service region and/or for determining actual courier travel times between a pickup location and a delivery location under current conditions. This information may be used, at least in part for predicting courier travel times.

Figure 5:
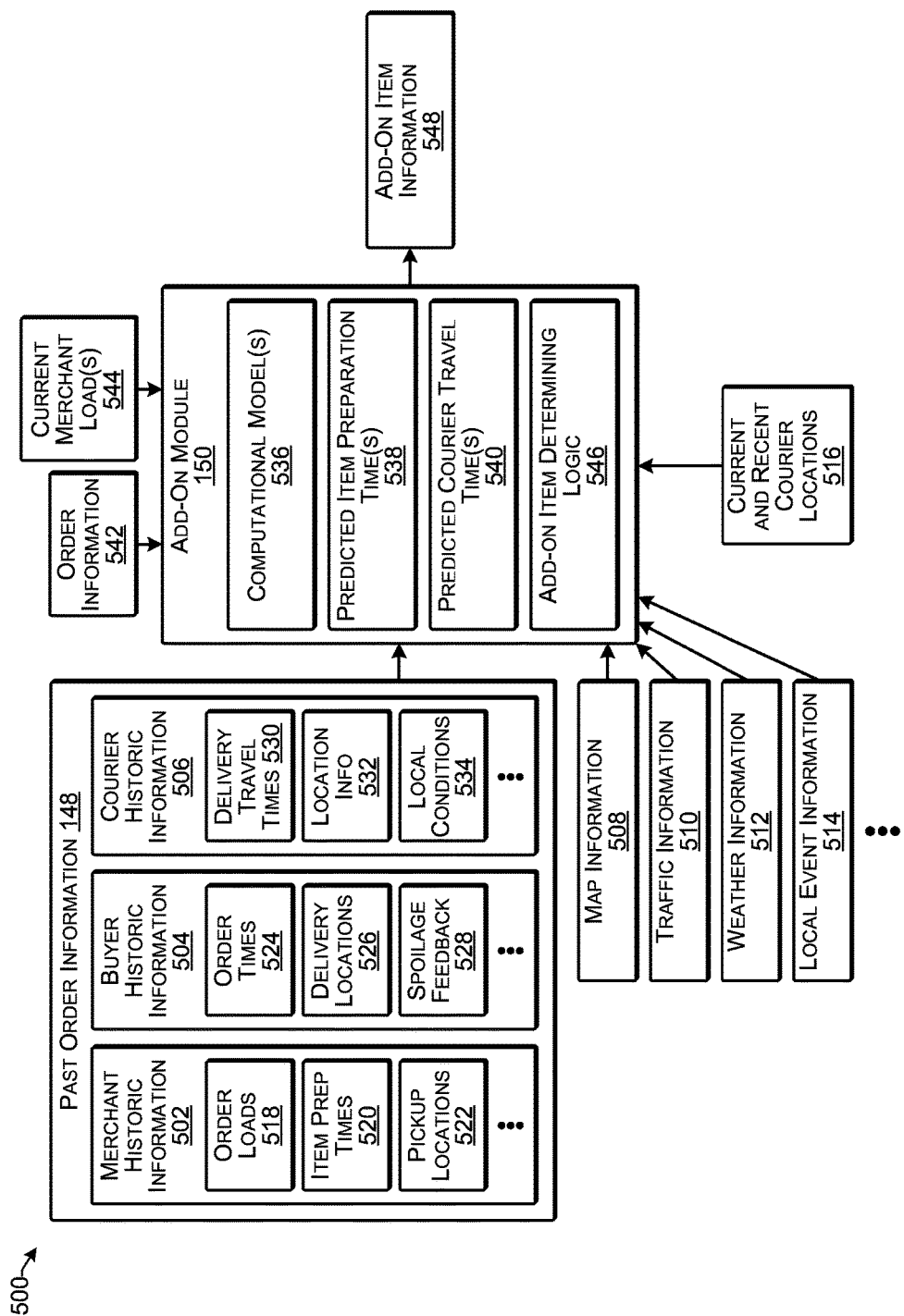
FIG. 5 is a block diagram illustrating an example framework for determining available add-on items according to some implementations.

FIG. 5 is a conceptual block diagram 500 illustrating an example of determining add-on items according to some implementations. In this example, the add-on module 150 may receive the past order information 148 including merchant historic information 502, buyer historic information 504, and courier historic information 506. In addition, the add-on module 150 may receive map information 508, traffic information 510, weather information 512, local event information 514, and/or current and recent courier location information 516. Further, while several types of information that may be used by the add-on module 150 are illustrated, in other examples, other or additional types of information may be used by the add-on module 150, as discussed above, and/or as will be apparent to those of skill in the art having the benefit of the disclosure herein.

The merchant historic information 502 includes historic order information related to the merchants, e.g., various types of information related to past orders filled by the merchants that participate in the service of the service provider 104. For instance, the merchant historic information 502 may include order loads 518 from each merchant at particular times on particular days of the week, particular dates, and the like, indicating how many orders each merchant was fulfilling ate the particular times. Further, the merchant historic information 502 may include item preparation times 520 for each item offered by each merchant and the pickup locations 522 associated with each merchant. As one example, each merchant may initially specify an expected preparation time for each item or each category of item offered by the merchant. In some cases, the merchants or the service provider may categorize items into preparation-time-based item categories, such that items having a similar preparation times are categorized into the same item category. Subsequently, as the service provider determines actual item preparation times for particular items offered by each merchant, and further, the order load 518 on each merchant when the preparation times are determined, the add-on module may use a current merchant order load to determine a predicted preparation time for a current order, as discussed additionally below.

Additionally, the buyer historic information 504 includes historic order information related to the buyers. Examples of buyer historic information 504 may include order times 524, e.g., a time of day, day of the week, and date on which each order was placed. The buyer historic information 504 may further include delivery locations 526 to which each order was delivered, and spoilage feedback 528. For instance, feedback may be received from the buyer devices that may indicate if one or more items from an order spoiled prior to delivery to the buyer. Spoilage may be indicated by items that are of a degraded quality. This spoilage feedback 528 may be used to adjust or otherwise change certain thresholds used herein. For example, if spoilage feedback 528 is received for a first item in an order in which an add-on item was obtained from a merchant within a threshold distance of the first merchant, or from a merchant within a threshold proximity of the courier travel route, this spoilage feedback 528 may indicate that the threshold distance or threshold proximity, respectively, might need to be reduced to avoid spoilage of the first ordered item.

Further, the courier historic information 506 includes historic order information related to the couriers. For example, the courier historic information 506 may include delivery travel times 530, which may indicate the time that an order was picked up and the time that the order was delivered, e.g., how long it took each courier to arrive at a delivery location after picking up the order from the merchant's pickup location. Additionally, location information 532 may include locations of individual couriers at different times of day, for different days of the week in different parts of the service region. For instance, the courier location information 532 may indicate speeds at which couriers are able to travel on different streets in the service region at different times of day, thereby providing an indication of traffic information and an indication of predicted delivery travel times at different times of day and different days of the week. The location information 532 may further indicate how far each courier had to travel after picking up each order to make delivery of the order.

In some examples, the courier application may automatically send courier locations 516 to the add-on module 150 on a periodic basis while the associated courier is on-duty or otherwise active. Alternatively, the add-on module 150 may periodically ping the courier devices of active couriers to determine the couriers' current locations. The received courier locations 516 may indicate current courier travel speeds and conditions, and may be stored as location information 532. Each courier device may include one or more location sensors, such as a GPS receiver, or communication interfaces that can determine (e.g., from cell towers or wireless access points) a geographic location of the courier device.

In addition, the courier historic information 506 may include local conditions 534, such as traffic conditions and weather conditions when particular orders were fulfilled, information regarding any local events taking place within the service region when the orders were fulfilled, and the like. Furthermore, the merchant historic information 502, the buyer historic information 504, and the courier historic information 506 may include additional types of information, with the foregoing being merely several examples of the types of information that may be used by the add-on module 150.

In some implementations, the add-on module 150 may employ one or more computational models 536 for determining predicted item preparation times 538 for various different items offered by various different merchants. As mentioned above, the predicted item preparation time 538 may include the time for preparing the item, such as cooking and/or packaging an item for transport. For instance, the add-on module 150 may receive order information 542 for a current order, such as merchant identity, merchant pickup location, item identity, etc. Further, in some examples, the add-on module 150 may receive a current merchant load 544 for at least the merchant identified in the order information 542.

The add-on module 150 may use the computational model(s) 536 to determine the predicted preparation times 538 of various different items offered by the merchant corresponding to the order information 542. For instance, the predicted preparation times 538 may be based at least in part on the item preparation times 520 indicated in the merchant historic information 520. Additionally, in some examples, the predicted preparation times 538 may be determined based at least in part on the current merchant load. For example, by comparing the current merchant load 544 with the historic order loads 518, and item preparation times 520 for the historic order loads 518, the computational model may determine current predicted item preparation times 538 for particular items offered by the merchant. Alternatively, in other examples, the merchant who receives the order may provide a predicted item preparation time that may be included in the order information 542 used by the add-on module 150.

Furthermore, in some examples, the add-on module 150 may employ the one or more computational models 536 for determining predicted courier travel times 540 between a merchant pickup location, other merchant pickup locations, and/or the delivery location specified by a buyer. The predicted courier travel times 540 may be based in part on the courier historic information 506, such as based on courier location information 532 that indicates courier movement within the service region at particular times, on particular days, on particular dates, during particular types of weather, or while other local conditions 534 are in effect.

The predicted courier travel times may further be based at least in part on current or future information, such as weather information 512, and local event information 514. As one example, based at least in part on the one or more computational models 536, the add-on module 150 may determine a confidence score for a prediction of how long it will take a courier to travel from a first point to a second point within the service region at a particular time on a particular day of the week. The current and recent courier location information 516 may also be considered when determining the predicted courier travel times 540. For example, recent courier movement, or lack thereof, may indicate unexpectedly heavy traffic in the service region. Additionally, in some examples, traffic information 510 from an online map service, such as may be obtained from a webserver or other network source, may also be used or taken into consideration by the computational model when determining the predicted courier travel times.

As one example, the computational model(s) 536 may include one or more trained statistical models that account for numerous pieces of information included in the past order information 148, as well as current information, such as time, day and date information, traffic information 510, weather information 512, local event information 514, order information 542 and/or current merchant load 544. In some cases, the one or more statistical models may be initially trained using a set of training data, checked for accuracy, and then used for predicting at least one of preparation times or courier travel times based on a confidence score exceeding a specified threshold of confidence. The statistical model(s) may be periodically updated and re-trained based on new training data to keep the model(s) up to date and accurate. Examples of suitable statistical models that may be incorporated into the computational model(s) 536 herein may include regression models, such as linear and nonlinear regression models, and stochastic models, such as Markov models, hidden Markov models, and so forth.

Additionally, while the computational model 536 has been described as one example of a technique for determining predicted preparation times 538 and/or predicted courier travel times 540, numerous other techniques, algorithms, decision-making rules, and the like, may additionally, or alternatively, be used for determining this information. Accordingly, implementations herein are not limited to use of a computational model 536.

After the add-on module 150 has determined, for the current order information 542, predicted preparation times 538 and/or predicted courier travel times 540, the add-on module 150 may apply add-on item determining logic 546 to these predictions, to determine add-on item information 548 for the current order. In some examples, the add-on item determining logic 546 may include one or more algorithms, one or more computational models, a plurality of decision-making rules, or the like, configured to determine add-on items based on the predicted item preparation times 538 and, in some cases, the predicted courier travel times 540. For instance, the add-on item determining logic 546 may employ the techniques discussed above with respect to FIGS. 1-3 to determine the add-on item information 548 based on the predicted item preparation time for an ordered item, and the predicted item preparation times for other items offered by the same merchant.

In addition, add-on item determining logic 546 may use the predicted courier travel times 540 from the first merchant pickup location to other merchant locations to determine whether other merchants are within a threshold distance of the first merchant and/or within a threshold proximity to the predicted courier travel route. The add-on item determining logic 546 may identify any of these merchants, and may further determine predicted item preparation times 538 for these other merchants to determine add-on item information 548 for these other merchants. In some cases, the add-on module 150 may receive current merchant load information 544 for these other merchants when determining the predicted item preparation times 538 for these other merchants.

As mentioned above, the add-on item information 548 may include information about the items, such as description and price. The add-on item information 548 may also include a time remaining for the buyer to order the corresponding item as an add-on item that can be added on to the order that the buyer has already placed.

In addition, for some types of items that are prepared in batches, the add-on time may reset, at least in part, if another order for that item has been placed by another buyer. For instance, suppose that an add-on item offered is breadsticks that normally take ten minutes to prepare. Furthermore, suppose that when the merchant prepares the breadsticks, the merchant normally prepares two or more orders at a time. Accordingly, normally, the breadsticks may be indicated to be no longer available when the remaining preparation time for the original order has reached 10 minutes. However, if current merchant load 544 indicates that another customer has ordered breadsticks, the time remaining for ordering breadsticks may be reset to add more time, such as based on a difference between a time for packaging the breadsticks, e.g., two minutes, and the ten minutes required for both baking and packaging the breadsticks. Accordingly, the buyer may have eight additional minutes to decide whether to order the breadsticks as an add-on order in the case that a batch is already prepared/being prepared.

In some examples, the service provider may receive, from each courier device, an indication of a time when the courier picks up an order from a pickup location and a time at which the courier delivers the order to the delivery location. The service may adjust the computational model 536 for determining predicted courier travel times 538 based on the location information and/or other feedback received from the courier devices over a period of time. For example, if the actual courier travel time is different from that predicted by the computational model 536, the computational model 536 may be modified to predict courier travel times more accurately based on the location information 532.

Figure 6:
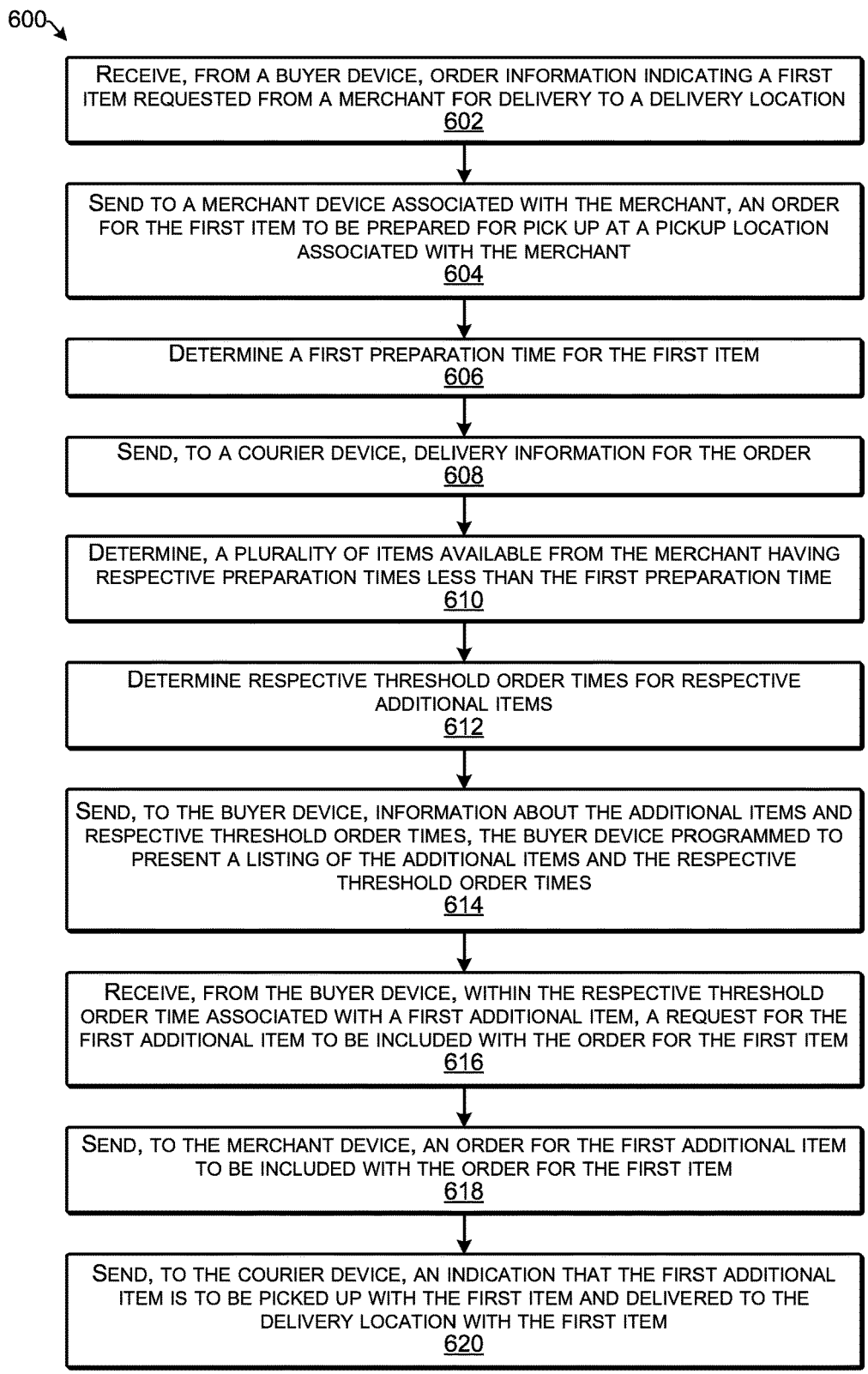
FIG. 6 is a flow diagram illustrating an example process for enabling ordering of add-on items according to some implementations.
Figure 7:
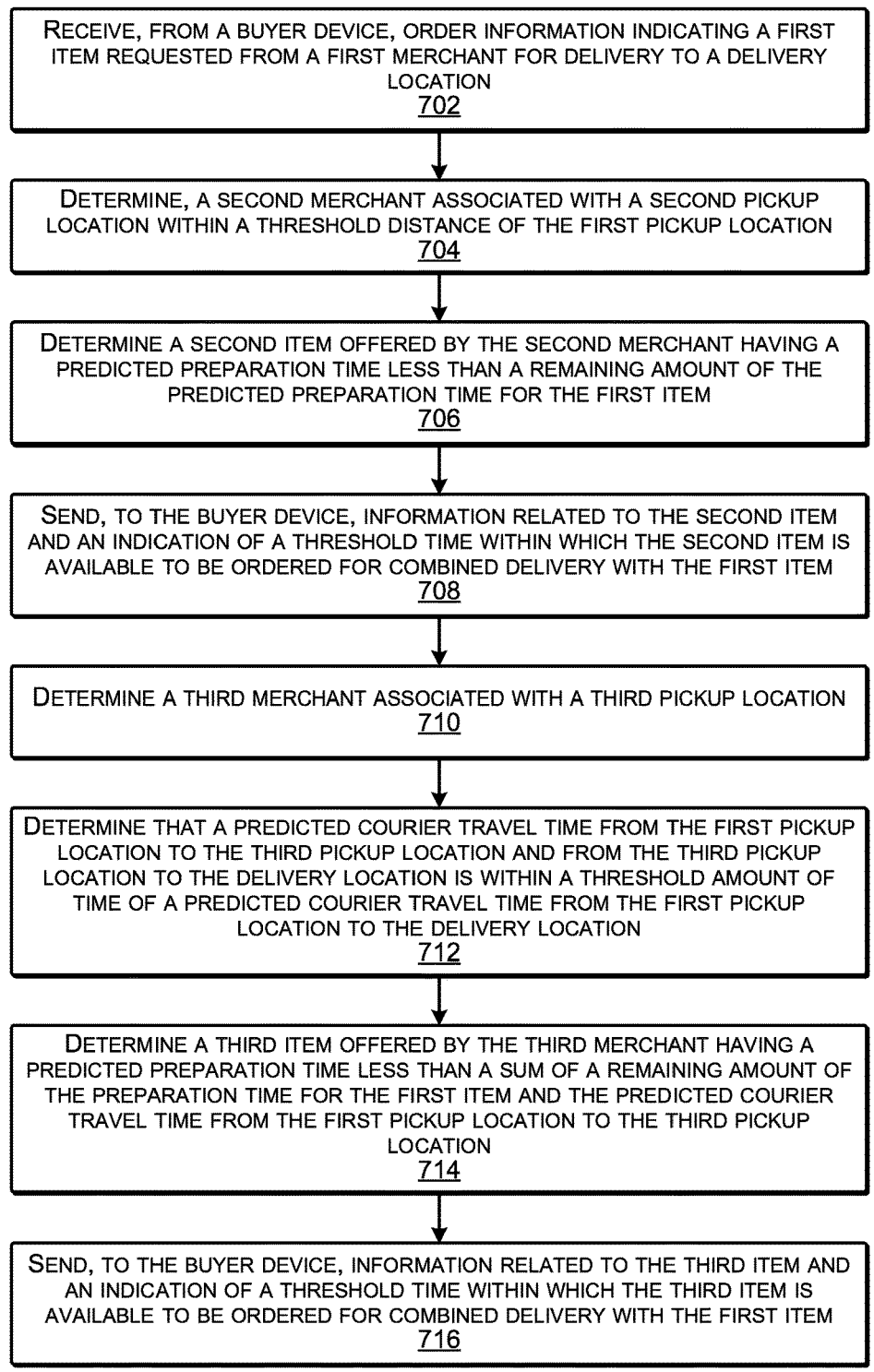
FIG. 7 is a flow diagram illustrating an example process for enabling ordering of add-on items according to some implementations.

FIGS. 6 and 7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 6 is a flow diagram illustrating an example process 600 for determining add-on item information according to some implementations. In some examples, the process may be executed in part by the service computing device 102 and in part by the buyer device 132.

At 602, the service computing device may receive, from a buyer device associated with a buyer, order information indicating a first item requested from a merchant for delivery to a delivery location. For instance, the service computing device may receive, from the buyer device, an indication of the delivery location, and may send, to the buyer device, item information about items offered by a plurality of merchants for delivery to the delivery location. The buyer device presents the item information on a display of the buyer device to enable the buyer to place an order.

At 604, the service computing device may send to a merchant device associated with the merchant, an order for the first item to be prepared for pick up at a pickup location associated with the merchant.

At 606, the service computing device may determine a first preparation time for the first item. In some examples, the service computing device may receive merchant information from the merchant device indicting the merchant's predicted preparation time for the first item. In other examples, the service computing device may receive merchant information from the merchant device indicating a current load on the merchant. The service computing device may compare the current load with past load and may determine item preparation times associated with similar past loads to determine a predicted item preparation time for the first item as well as for other items offered by the merchant.

At 608, the service computing device may send, to a courier device, delivery information for the order. The service provider may select a courier near the pickup location of the first merchant to pick up and deliver the first item to the delivery location.

At 610, the service computing device may determine, a plurality of items available from the merchant having respective preparation times less than the first preparation time. As discussed above, the preparation times may be determined based on past order information and/or based on merchant information received from the merchant device.

At 612, the service computing device may determine respective threshold order times for respective additional items. In some examples, the threshold time for each additional item may be determined from the remaining preparation time for the first item, minus the preparation times for the additional item, minus a default time to allow time for placement of the order.

At 614, the service computing device may send, to the buyer device, information about the additional items and respective threshold order times. The buyer device may be programmed to present a listing of the additional items and the respective threshold order times. Sending the information to the buyer device may cause, at least in part, the buyer device to present the listing along with a count down for each listed item of time remaining for the buyer to add the respective item to the first order.

At 616, the service computing device may receive, from the buyer device, within the respective threshold order time associated with a first additional item, a request for the first additional item to be included with the order for the first item. In some examples, if the buyer attempts to order an additional item after expiration of the associated threshold time, the a new order may be created that is not added on to the order for the first item.

At 618, the service computing device may send, to the merchant device, an order for the first additional item to be included with the order for the first item. The merchant may receive the order for the additional item and prepare both the first item and the additional item for being picked up together by the courier.

At 620, the service computing device may send, to the courier device, an indication that the first additional item is to be picked up with the first item and delivered to the delivery location with the first item. Thus, the courier may deliver the first item and the additional item to the delivery location together in a single delivery.

FIG. 7 is a flow diagram illustrating an example process 700 for determining add-on item information according to some implementations. In some examples, the process may be executed, at least in part, by the service computing device 102 or by another suitable computing device. Some or all of the process 700 may be combined with the process 600 in some examples.

At 702, the service computing device may receive, from a buyer device, order information indicating a first item requested from a first merchant for delivery to a delivery location.

At 704, the service computing device may determine, a second merchant associated with a second pickup location within a threshold distance of the first pickup location. For example, the threshold distance may be a relatively short distance from the first pickup location, such as less than 2-3 minutes of courier travel time.

At 706, the service computing device may determine a second item offered by the second merchant having a predicted preparation time less than a remaining amount of the predicted preparation time for the first item. For example, the service computing device may receive merchant information from the second merchant indicating a current load on the second merchant. Additionally or alternatively, the second merchant may provide predicted preparation times predicted by the merchant for particular items offered by the merchant. In some cases, the predicted preparation times may be predicted based on past order information, as discussed above.

At 708, the service computing device may send, to the buyer device, information related to the second item and an indication of a threshold time within which the second item is available to be ordered for combined delivery with the first item. Thus, items from the second merchant may be offered as add-on items for adding to the first order.

At 710, the service computing device may determine a third merchant associated with a third pickup location. In some cases, the service computing device may determine third merchants having a pickup location that is within a threshold proximity (distance and/or travel time) to a courier route from the first pickup location and the delivery location. Additionally, in some cases, blocks 710-716 may be performed without performing blocks 702-708, or alternatively, blocks 702-708 may be performed without performing blocks 710-716.

At 712, the service computing device may determine that a predicted courier travel time from the first pickup location to the third pickup location and from the third pickup location to the delivery location is within a threshold amount of time of a predicted courier travel time from the first pickup location to the delivery location.

At 714, the service computing device may determine a third item offered by the third merchant having a predicted preparation time less than a sum of a remaining amount of the preparation time for the first item and the predicted courier travel time from the first pickup location to the third pickup location. In some examples, the service computing device may receive merchant information from the third merchant indicating a current load on the third merchant, and this load information may be used at least in part for determining the predicted preparation times for the third item(s). In some cases, the predicted preparation times may be predicted based at least in part on past order information, as discussed above. Additionally or alternatively, the third merchant may provide predicted preparation times predicted by the merchant for particular items offered by the merchant.

At 716, the service computing device may send, to the buyer device, information related to the third item and an indication of a threshold time within which the third item is available to be ordered for combined delivery with the first item. Thus, items from the third merchant may be offered as add-on items for adding to the first order.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
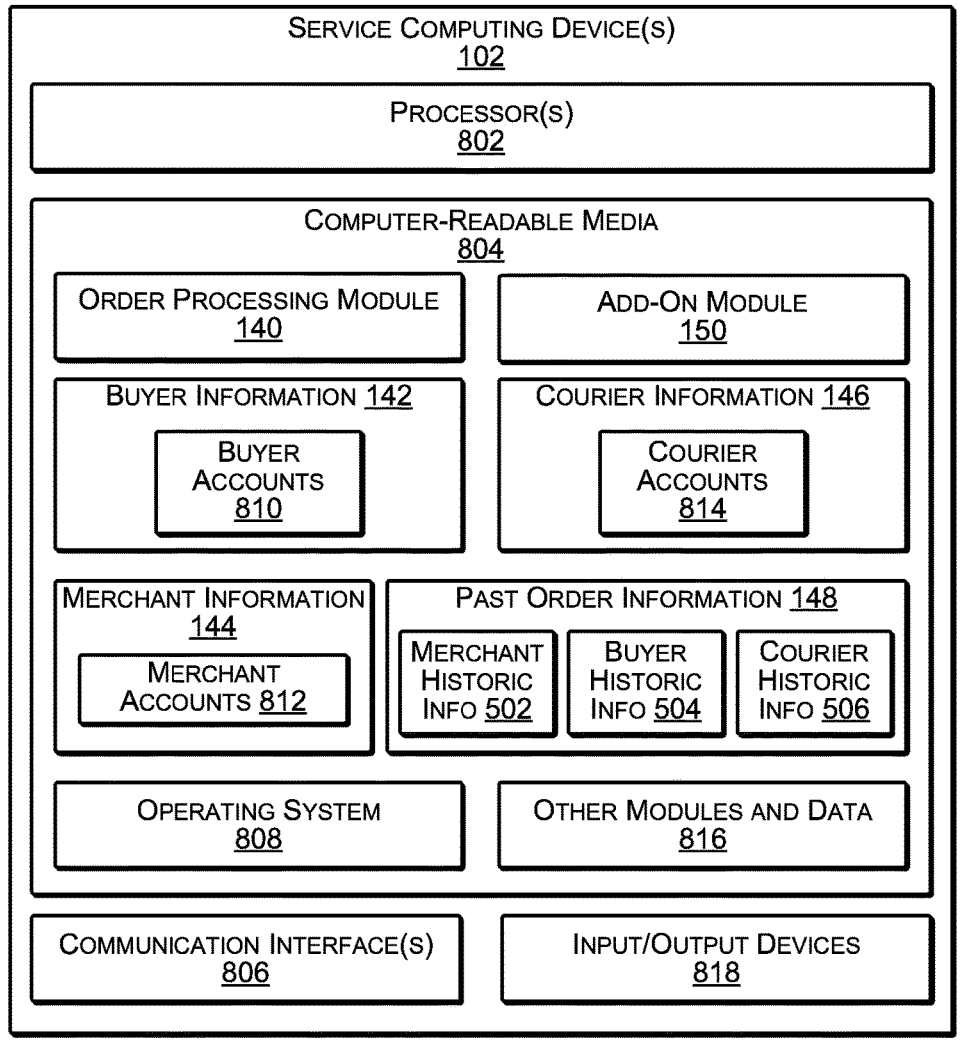
FIG. 8 illustrates select components of one or more example service computing devices according to some implementations.

FIG. 8 illustrates select components of the service computing device 102 that may be used to implement some functionality of the add-on order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the order processing module 140 and the add-on module 150. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store the buyer information 142, including buyer accounts 810, the merchant information 144, including merchant accounts 812, and the courier information 146, including courier accounts 814. Further, the computer-readable media 804 may include the past order information 146, such as the merchant historic information 502, the buyer historic information 504, and the courier historic information 506. The service computing device 102 may also include or maintain other functional components and data not specifically shown in FIG. 8, such as other modules and data 816, which may include programs, drivers, etc., and the data used or generated by the functional components. Further, the service computing device 102 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks (e.g., fiber optic and Ethernet), as well as short-range communications, such as BLUETOOTH®, BLUETOOTH® low energy, and the like, as additionally enumerated elsewhere herein.

The service computing device 102 may further be equipped with various input/output (I/O) devices 818. Such I/O devices 818 may include a display, various user interface controls (e.g., buttons, joystick, keyboard, mouse, touch screen, etc.), audio speakers, connection ports and so forth.

Figure 9:
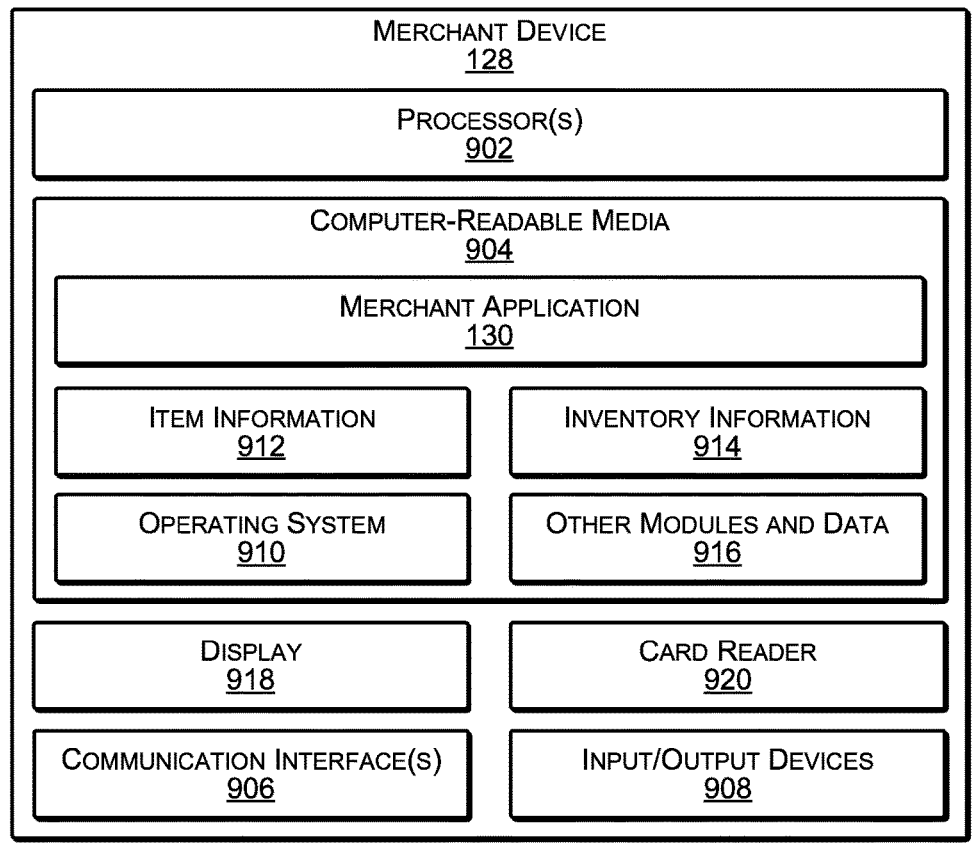
FIG. 9 illustrates select components of an example merchant device according to some implementations.

FIG. 9 illustrates select example components of an example merchant device 128 according to some implementations. The merchant device 128 may be any suitable type of computing device, e.g., portable, semi-portable, semi-stationary, or stationary. Some examples of the merchant device 128 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 128 includes at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the merchant device 128, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the merchant device 128 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the merchant device 128. Functional components of the merchant device 128 stored in the computer-readable media 904 may include the merchant application 130. In some examples, the merchant application 130 may include transaction processing capability, such as for presenting an interface to enable the merchant to conduct transactions, receive payments, and so forth, as well as communicating with the service computing device 102 for processing payments, sending transaction information, receiving order information, sending merchant information, and so forth. Further, in some examples, the merchant application 130 may include merchant dashboard functionality, such as for presenting a GUI (not shown in FIG. 9) to enable the merchant to manage the merchant's account, the merchant profile, merchant preferences, view past orders, and the like. Additional functional components may include an operating system 910 for controlling and managing various functions of the merchant device 128 and for enabling basic user interactions with the merchant device 128.

In addition, the computer-readable media 904 may also store data, data structures and the like, that are used by the functional components. For example, data stored by the computer-readable media 904 may include item information 912 that includes information about the items offered by the merchant, which may include images of the items, descriptions of the items, prices of the items, preparation times for the items, and so forth. In addition, inventory information 914 may indicate how much of each item the merchant has in current inventory. Depending on the type of the merchant device 128, the computer-readable media 904 may also optionally include other functional components and data, such as other modules and data 916, which may include programs, drivers, etc., and the data used or generated by the functional components. Further, the merchant device 128 may include many other logical, programmatic, and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as short-range communications such as Bluetooth®, Bluetooth® low energy, and the like, as additionally enumerated elsewhere herein.

FIG. 9 further illustrates that the merchant device 128 may include a display 918. Depending on the type of computing device used as the merchant device 128, the display 918 may employ any suitable display technology, and may have a touch sensor in some examples. Alternatively, in some examples, the merchant device 128 may not include the display 918, and information may be presented by other means, such as aurally.

The merchant device 128 may further include the one or more I/O devices 908. The I/O devices 908 may include speakers, a microphone, a camera, and various user controls (e.g., buttons, a joystick, a keyboard, a keypad, etc.), a haptic output device, and so forth.

In addition, the merchant device 128 may include or may be connectable to a card reader 920. In some examples, the card reader may plug in to a port in the merchant device, such as a microphone/headphone port, a data port, or other suitable port. The card reader 920 may include a read head for reading a magnetic strip of a payment card, and further may include encryption technology for encrypting the information read from the magnetic strip. Additionally, or alternatively, numerous other types of card readers may be employed with the merchant devices 104 herein, such as RFID chip card readers, depending on the type and configuration of the merchant device 128. Additionally, the merchant device 128 may include various other components that are not shown, examples of which include sensors, removable storage, a power source, such as a battery and power control unit, and so forth.

Figure 10:
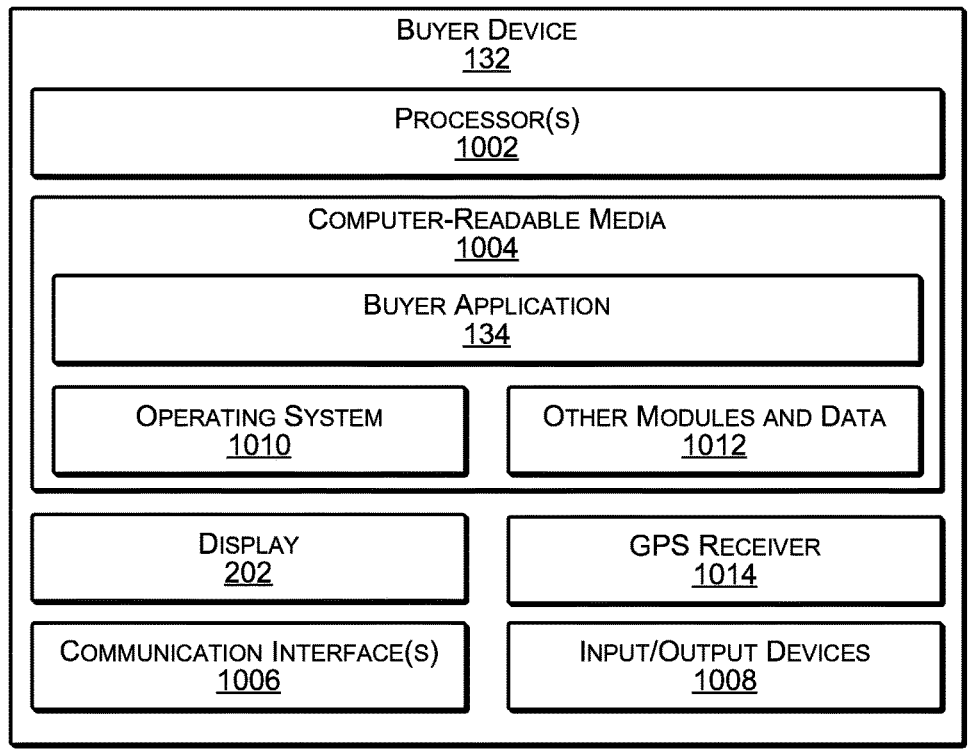
FIG. 10 illustrates select components of an example buyer device according to some implementations.

FIG. 10 illustrates select example components of the buyer device 132 that may implement the functionality described above according to some examples. The buyer device 132 may be any of a number of different types of computing devices. Some examples of the buyer device 132 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 132 may be a stationary or semi-stationary computing device, such as a desktop computer or other device with computing capabilities.

In the example of FIG. 10, the buyer device 132 includes components such as at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the buyer device 132, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, magnetic disk storage, optical storage, and/or other computer-readable media technology. Further, in some cases, the buyer device 132 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules, or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the buyer device 132. Functional components of the buyer device 132 stored in the computer-readable media 1004 may include the buyer application 134, as discussed above, which may present the buyer with one or more GUIs for placing an order, some examples of which are described above. Additional functional components may include an operating system 1010 for controlling and managing various functions of the buyer device 132 and for enabling basic user interactions with the buyer device 132.

In addition, the computer-readable media 1004 may also store data, data structures and the like, that are used by the functional components. Depending on the type of the buyer device 132, the computer-readable media 1004 may also optionally include other functional components and data, such as other modules and data 1012, which may include applications, programs, drivers, etc., and the data used or generated by the functional components. Further, the buyer device 132 may include many other logical, programmatic, and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks (e.g., fiber optic, Ethernet), as well as short-range communications such as BLUETOOTH®, BLUETOOTH® low energy, and the like, as additionally enumerated elsewhere herein.

FIG. 10 further illustrates that the buyer device 132 may include the display 202, which may employ any suitable display technology. In some examples, the display 202 may have a touch sensor to provide a touchscreen display. The buyer device 132 may further include the one or more I/O devices 1008. The I/O devices 1008 may include speakers, a microphone, a camera, and various user controls (e.g., buttons, a joystick, a keyboard, a keypad, etc.), a haptic output device, and so forth. Other components included in the buyer device 132 may include various types of sensors, which may include a GPS receiver 1014 able to indicate location information, as well as other sensors (not shown) such as an accelerometer, gyroscope, compass, proximity sensor, and the like. In some cases, the GPS receiver 1014 may be used by the buyer application 134 to determine or confirm a current geographic location of the buyer device 132. Additionally, or alternatively, the communication interfaces 1006 may be used to determine the current location of the buyer device 132, such as based on communication with nearby cell towers, wireless access points, and the like. In some examples, the buyer application 134 may send this location information to the service computing device as an indicated delivery location for the associated buyer. Additionally, the buyer device 132 may include various other components that are not shown, examples of which include removable storage, a power source, such as a battery and power control unit, and so forth.

Figure 11:
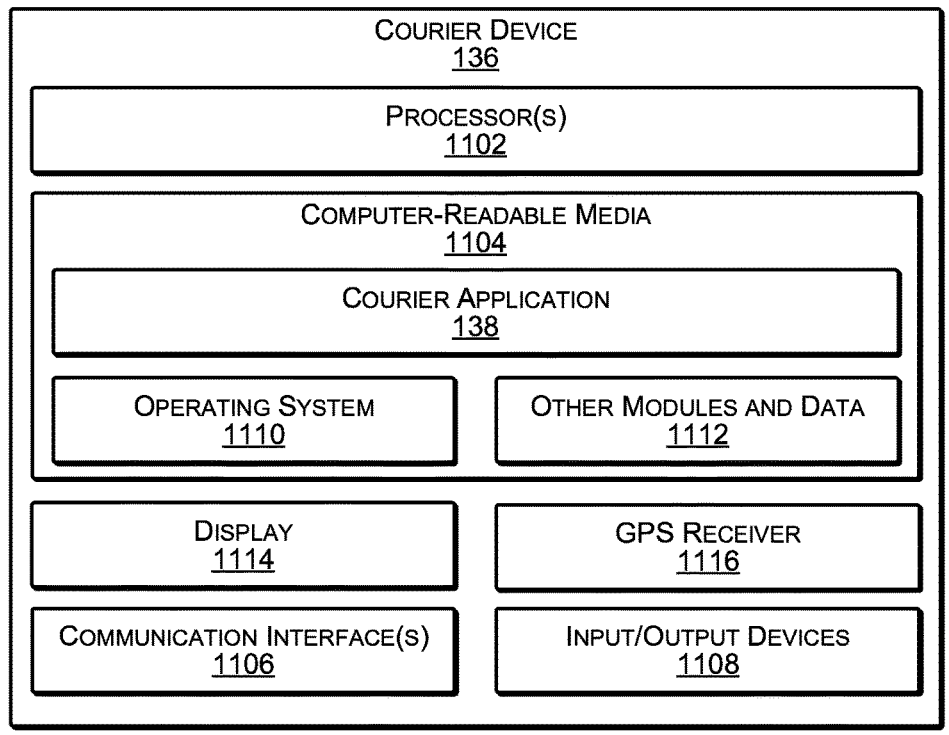
FIG. 11 illustrates select components of an example courier device according to some implementations.

FIG. 11 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 11, the courier device 136 includes components such as at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the courier device 136, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1104 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules, or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the courier device 136. Functional components of the courier device 136 stored in the computer-readable media 1104 may include the courier application 138, as discussed above. Additional functional components may include an operating system 1110 for controlling and managing various functions of the courier device 136 and for enabling basic user interactions with the courier device 136.

In addition, the computer-readable media 1104 may also store data, data structures and the like, that are used by the functional components. Depending on the type of the courier device 136, the computer-readable media 1104 may also optionally include other functional components and data, such as other modules and data 1112, which may include applications, programs, drivers, etc., and the data used or generated by the functional components. Further, the courier device 136 may include many other logical, programmatic, and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 11 further illustrates that the courier device 136 may include a display 1014, which may be the any of various types of displays. The courier device 136 may further include the one or more I/O devices 1108. The I/O devices 1108 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS receiver 1116 able to indicate location information, as well as other sensors (not shown) such as an accelerometer, gyroscope, compass, proximity sensor, and the like. In some cases, the GPS receiver 1116 may be used by the courier application 138 to determine a current geographic location of the courier device 136. Additionally, or alternatively, the communication interfaces 1106 may be used to determine the current location of the courier device, such as based on communication with nearby cell towers, wireless access points, and the like. In some examples, the courier application 138 may send this location information periodically to the service computing device as an indicated location of the associated courier. Additionally, the courier device 136 may include various other components that are not shown, examples of which include removable storage, a power source, such as a battery and power control unit, and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more courier devices, each associated with a respective courier, each courier device including a respective courier device processor, a respective courier device GPS receiver coupled to the respective courier device processor, and a respective courier device communication interface coupled to the respective courier device processor for communicating over one or more networks;
   one or more merchant devices, each associated with a respective merchant, each merchant device including a respective merchant device processor and a respective merchant device communication interface coupled to the respective merchant device processor for communicating over the one or more networks;
   one or more buyer devices, each associated with a respective buyer, each buyer device including a respective buyer device processor and a respective buyer device communication interface coupled to the respective buyer device processor for communicating over the one or more networks; and a service computing device including a service computing device processor and a service computing device communication interface coupled to the service computing device processor for communicating over the one or more networks with the one or more courier devices, the one or more buyer devices, and the one or more merchant devices, the service computing device programmed to:

receive, from a buyer device associated with a first buyer, an indication of a delivery location;

send, to the buyer device, item information about items offered by a plurality of merchants for delivery to the delivery location, wherein the buyer device presents the item information on a display of the buyer device;

receive, from the buyer device, first order information indicating a first item requested from a first merchant for delivery to the delivery location;

send to a merchant device associated with the first merchant of a first enterprise, an order for the first item to be prepared for pick up at a first pickup location associated with the first merchant;

determine a first preparation time for the first item;

send to a courier device associated with a first courier not of the first enterprise or a second enterprise, delivery information indicating the delivery location, the pickup location associated with the first merchant, item information about the first item to be picked up from the pickup location, and an indication of a pickup time based at least in part on the first preparation time for the first item;

determine a route able to be traveled by a courier from the first pickup location to the delivery location;

determine a second merchant having a second pickup location within at least one of a threshold distance or a threshold travel time of the route, wherein the second merchant is of the second enterprise, different from the first enterprise;

determine a second item offered by the second merchant having a predicted preparation time less than a sum of a remaining amount of the preparation time for the first item plus a predicted courier travel time from the first pickup location to the second pickup location, wherein the predicted preparation time for the second item is determined based at least in part on at least one of: information provided by the second merchant, or preparation times from a plurality of past orders prepared by the second merchant;

determine a threshold order time for the second item, wherein the threshold order time is based at least in part on a difference between the first preparation time and the predicted preparation time of the second item;

send, to the buyer device, information about the second item and the threshold order time, wherein the buyer device is programmed to present on the display:
  a listing of the second item as an add-on item available to be added to the order, and
  the threshold order time for ordering the second item, wherein the second item in the listing is indicated to be unavailable as the threshold order time expires;

receive, from the buyer device, within the threshold order time associated with the second item, a request for the second item to be included with the order for the first item;

send, to a merchant device associated with the second merchant, an order for the second item to be prepared for pick up at the second pickup location associated with the second merchant; and send, to the courier device, an indication that the second item is to be picked up from the second pickup location and delivered to the delivery location with the first item.

2. The system as recited in claim 1, wherein the service computing device is further programmed to:

determine a third item offered by the first merchant having a predicted preparation time less than a remaining amount of the preparation time for the first item; and send, to the buyer device, information related to the third item and a threshold order time associated with the third item;

wherein the buyer device is further programmed to present information related to the third item and the threshold order time associated with the third item with an indication that the third item is available to be added on to the order for the first item.

3. The system as recited in claim 1, wherein the service computing device is further programmed to determine at least one of the first preparation time or the respective preparation times of the additional items by:

receiving merchant information indicating a merchant load based at least in part on a number of orders received and to be prepared by the first merchant;

comparing the merchant load with past order information indicating preparation times for items associated with past merchant loads; and determining the at least one of the first preparation time or the respective preparation times of the additional items based at least in part on the comparing.

4. A method comprising:

receiving, by one or more processors, from a buyer device, an order for a first item from a first merchant for delivery to a delivery location;

sending, by the one or more processors, to a merchant device associated with the first merchant of a first enterprise, the order for the first item;

sending, by the one or more processors, delivery information to a courier device associated with a first courier not of the first enterprise or a second enterprise;

determining, by the one or more processors, a route able to be traveled by the first courier from a first pickup location of the first merchant to the delivery location;

determining, by the one or more processors, a second merchant having a second pickup location within at least one of a threshold distance or a threshold travel time of the route, wherein the second merchant is of the second enterprise, different from the first enterprise;

determining, by the one or more processors, a second item offered by the second merchant having a predicted preparation time less than a sum of a remaining preparation time for the first item plus a predicted courier travel time from the first pickup location to the second pickup location, wherein the predicted preparation time for the second item is determined based at least in part on at least one of: information provided by the second merchant, or preparation times from a plurality of past orders prepared by the second merchant;

determining, by the one or more processors, a threshold order time for a second item, wherein the threshold order time is based at least in part on a difference between a first preparation time and the predicted preparation time of the second item;

sending, by the one or more processors, to the buyer device, information related to the second item and an indication that the second item is available to be added to the order for the first item for being delivered together to the delivery location;

receiving, by the one or more processors, from the buyer device, within the threshold order time associated with the second item, a request for the second item to be included with the order for the first item;

sending, by the one or more processors, to a merchant device associated with the second merchant, an order for the second item to be prepared for pick up at a second pickup location associated with the second merchant; and sending, by the one or more processors, to the courier device, an indication that the second item is to be picked up from the second pickup location and delivered to the delivery location with the first item.

5. The method as recited in claim 4, further comprising:
receiving as at least a portion of the merchant information received from the first merchant, a merchant load indicating a number of orders to be prepared by the first merchant;
comparing the merchant load with past order information indicating preparation times for items associated with past merchant loads; and
determining the preparation time for the first item based at least in part on the determining a past preparation time for the first item, determined based at least in part on comparing the merchant load with the past merchant loads.

6. The method as recited in claim 4, wherein sending the information related to the second item to the buyer device causes, at least in part, an application on the buyer device to present a user interface including information about the second item and the threshold order time.

7. The method as recited in claim 4, further comprising:
receiving, from the first merchant, inventory information for items offered by the first merchant; and
determining that the inventory information indicates a quantity of the second item is above an inventory threshold prior to sending the information about the second item to the buyer device.

8. The method as recited in claim 4, further comprising receiving, from the buyer device, the indication of the delivery location based at least in part on a geographic location of the buyer device determined from information from a GPS receiver included in the buyer device.

9. One or more non-transitory computer-readable media maintaining instructions that, when executed by one or more processors, program the one or more processors to:
receive, from a buyer device, an order for a first item for delivery to a delivery location;
send, to a first merchant device associated with a first pickup location of a first merchant of a first enterprise, information about the first item;
send delivery information to a courier device associated with a first courier not of the first enterprise or a second enterprise;
determine a route able to be traveled by the first courier from a first pickup location of the first merchant to the delivery location;
determine a second merchant having a second pickup location within at least one of a threshold distance or a threshold travel time of the route, wherein the second merchant is of the second enterprise, different from the first enterprise;
determine a second item offered by the second merchant having a predicted preparation time less than a sum of a remaining preparation time for the first item plus a predicted courier travel time from the first pickup location to the second pickup location, wherein the predicted preparation time for the second item is determined based at least in part on at least one of: information provided by the second merchant, or preparation times from a plurality of past orders prepared by the second merchant;

determine a threshold order time for a second item, wherein the threshold order time is based at least in part on a difference between a first preparation time and the predicted preparation time of the second item;

send to the buyer device, information related to the second item and an indication that the second item is available to be added to the order for the first item for being delivered together to the delivery location;

receive from the buyer device, within the threshold order time associated with the second item, a request for the second item to be included with the order for the first item;

send to a merchant device associated with the second merchant, an order for the second item to be prepared for pick up at a second pickup location associated with the second merchant; and send to the courier device, an indication that the second item is to be picked up from the second pickup location and delivered to the delivery location with the first item.

10. The one or more non-transitory computer-readable media as recited in claim 9, wherein the instructions further program the one or more processors to:
send, to the buyer device, an indication of the threshold order time to enable presentation of the threshold order time on the buyer device.

11. The one or more non-transitory computer-readable media as recited in claim 9, wherein the instructions further program the one or more processors to:
determine a third item offered by the first merchant having a predicted preparation time less than a remaining amount of the preparation time for the first item; and
send, to the buyer device, information related to the third item and an indication of a threshold time within which the third item is available to be ordered for delivery with the order for the first item.

12. The one or more non-transitory computer-readable media as recited in claim 9, wherein the instructions further program the one or more processors to:
receive at least one of weather information, traffic information, or local event information; and
determine the predicted courier travel time based at least in part on the at least one of the weather information, traffic information, or local event information.

13. A system comprising one or more processors programmed to:
receive, from a buyer device, an order for a first item for delivery to a delivery location;
send, to a first merchant device associated with a first pickup location of a first merchant of a first enterprise, information about the first item;
determine a predicted preparation time for the first item;
send delivery information to a courier device associated with a first courier not of the first enterprise or a second enterprise;
determine a route able to be traveled by the first courier from a first pickup location of the first merchant to the delivery location;
determine a second merchant associated with a second pickup location within a threshold distance of the first pickup location of the first merchant, wherein the second merchant is of the second enterprise, different from the first enterprise;

determine a second item offered by the second merchant having a predicted preparation time less than a sum of a remaining amount of the predicted preparation time for the first item plus a predicted courier travel time from the first pickup location to the second pickup location, wherein the predicted preparation time for the second item is determined based at least in part on at least one of: information provided by the second merchant, or preparation times from a plurality of past orders prepared by the second merchant;

send, to the buyer device, information related to the second item and an indication of a threshold time within which the second item is available to be ordered for combined delivery with the order for the first item, wherein the threshold time is based at least in part on a difference between the predicted preparation time for the second item and the remaining amount of the predicted preparation time for the first item;

receive from the buyer device, within the threshold time, a request for the second item to be included with the order for the first item;

send to a merchant device associated with the second merchant, an order for the second item to be prepared for pick up at the second pickup location associated with the second merchant; and send to the courier device, an indication that the second item is to be picked up from the second pickup location and delivered to the delivery location with the first item.

14. The system as recited in claim 13, wherein the one or more processors are further programmed to determine the predicted preparation time for the first item based at least in part on merchant information received from the first merchant device.

15. The system as recited in claim 14, wherein:

the merchant information received from the first merchant device includes information about a number of orders received by the first merchant device over a first period of time; and the one or more processors are further programmed to determine the predicted preparation time for the first item based at least in part on the number of orders and past order information indicating preparation times for items associated with past orders in comparison with a number of received past orders.

* * * * *